US008743463B2

(12) United States Patent
Fujishiro

(10) Patent No.: US 8,743,463 B2
(45) Date of Patent: Jun. 3, 2014

(54) VIRTUAL IMAGE DISPLAY

(75) Inventor: Takeshi Fujishiro, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/351,814

(22) Filed: Jan. 17, 2012

(65) Prior Publication Data
US 2012/0200934 A1 Aug. 9, 2012

(30) Foreign Application Priority Data

Feb. 4, 2011 (JP) .................................. 2011-022230
Sep. 2, 2011 (JP) .................................. 2011-191811

(51) Int. Cl.
G02B 27/01 (2006.01)
(52) U.S. Cl.
CPC .................................. G02B 27/0179 (2013.01)
USPC ................................ 359/630; 345/8; 351/153
(58) Field of Classification Search
CPC ..................... G02B 27/0179; G02B 2027/0134
USPC ............. 359/630, 632; 345/7–9; 351/41, 111, 351/153
See application file for complete search history.

(56) References Cited

U.S. PATENT DOCUMENTS

| 5,276,471 A * | 1/1994 | Yamauchi et al. ............ 351/153 |
| 6,480,174 B1 * | 11/2002 | Kaufmann et al. ............... 345/8 |
| 2007/0070859 A1 | 3/2007 | Hirayama |
| 2008/0297717 A1 * | 12/2008 | Fukuoka ......................... 351/113 |
| 2010/0103078 A1 * | 4/2010 | Mukawa et al. .................... 345/8 |
| 2011/0050655 A1 * | 3/2011 | Mukawa ......................... 345/204 |

FOREIGN PATENT DOCUMENTS

| JP | A-2006-162767 | 6/2006 |
| JP | A-2006-262146 | 9/2006 |

* cited by examiner

Primary Examiner — Darryl J Collins
Assistant Examiner — Gary O'Neill
(74) Attorney, Agent, or Firm — Oliff PLC

(57) ABSTRACT

A virtual image display includes at least an image forming device, a pair of accommodating members at least one of which accommodates the image forming device, a light guide member which guides image light received from the image forming device toward a predetermined outside position, and a pair of temples one and the other of which are rotatably attached to one and the other of the pair of the accommodating members, respectively. Each of either the accommodating members or the temples has a contact member which regulates rotation of the temple, and a position control member which shifts the corresponding contact member in a first direction extending nearer to or away from the corresponding accommodating member or temple on which the contact member is not provided.

12 Claims, 13 Drawing Sheets

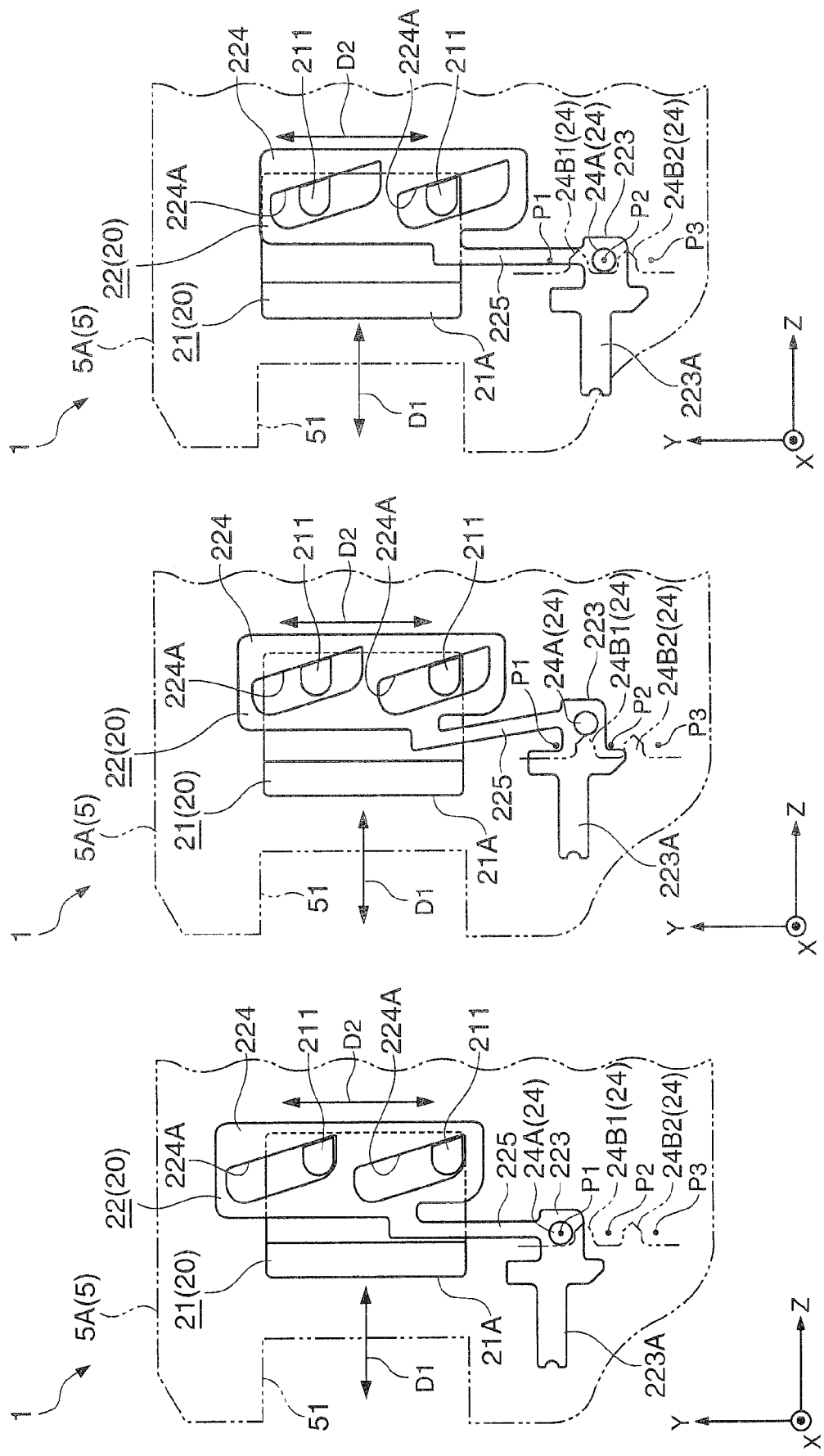

VIRTUAL IMAGE DISPLAY

CROSS-REFERENCE

The entire disclosure of Japanese Application No. 2011-022230, filed Feb. 4, 2011, and No. 2011-191811 filed Sep. 2, 2011 is expressly incorporated by reference herein.

BACKGROUND

1. Technical Field

The present invention relates to a virtual image display such as a head mount display attached to a head of an observer.

2. Related Art

A virtual image display (image display device) has been proposed which has an external appearance similar to that of spectacles and processes an image formed by a display element such as LCD (liquid crystal display) by using optical systems to produce a virtual image observed by an observer (for example, see JP-A-2006-162767).

A virtual image display disclosed in JP-A-2006-162767 includes an image display unit having a display element (such as LCD), a projection lens (objective lens) and others and fixed to a temple of a spectacle frame, and a light guide member (base) fixed to a front of the spectacle frame.

The light guide member has an introduction mirror and a combiner at one end and the other end, respectively, of the light guide member.

The introduction mirror receives image light emitted from the display element and projected through the projection lens as collimated light, and reflects the image light such that the image light can be guided toward the combiner by total reflection on the introduction mirror within the light guide member.

The combiner reflects the image light received by the total reflection within the light guide member such that the image light can reach a predetermined position outside the light guide member (left or right eye of the observer).

Generally, the virtual image display of the type disclosed in JP-A-2006-162767 is used by a variety of observers having different head sizes. Therefore, the virtual image display needs to have sufficient flexibility in its structure for allowing use by various observers.

According to the virtual image display proposed in JP-A-2006-162767, however, the pair of the temples are fastened to the front of the spectacle frame, leaving a fixed space between the temples. In this case, the virtual image display is difficult to be used by various types of observers having different head sizes, which lowers the degree of convenience in use of the virtual image display.

There is an idea of a structure of the virtual image display which is equipped with a hinge mechanism or the like capable of rotating the temples with respect to the front of the spectacle frame so as to allow use of the virtual image display by various observers, for example.

According to the virtual image display disclosed in JP-A-2006-162767, the image display unit is fixed to the temple. Therefore, when the structure of this idea is applied, the image display unit rotates together with the temple. In this case, the positional relationship between the projection lens (optical axis) and the light guide member (light guide mirror) fixed to the front of the spectacle frame changes, which makes it difficult to introduce the image light toward the left eye or the right eye of the observer in a preferable condition (to allow observation of the image by the observer in a preferable condition).

SUMMARY

An advantage of some aspects of the invention is to provide a virtual image display having excellent convenience for use.

A virtual image display according to an aspect of the invention includes: at least an image forming device which includes a display element emitting image light, and a projection lens projecting the image light received from the display element; a pair of accommodating members at least one of which accommodates the image forming device; a light guide member which guides image light received from the image forming device toward a predetermined outside position; and a pair of temples one and the other of which are rotatably attached to one and the other of the pair of the accommodating members, respectively, via hinge mechanisms. Each of either the accommodating members or the temples has a contact member brought into contact with the corresponding accommodating member or temple on which the contact member is not provided at the time of rotation of the temple to regulate the rotation of the temple, and a position control member which shifts the corresponding contact member in a first direction extending nearer to or away from the corresponding accommodating member or temple on which the contact member is not provided.

In the virtual display, the contact member and the position control member may be provided on each of either the accommodating members or the temples connected with each other via the hinge mechanisms.

In the following description, the components corresponding to "the accommodating members or the temples on each of which the contact member and the position control member are provided" are defined as the "accommodating members", while the components corresponding to "the accommodating members or the temples on each of which the contact member and the position control member are not provided" are defined as the "temples", that is, the contact members and the position control members are equipped on the accommodating members, for convenience of explanation.

According to this structure, the contact member brought into contact with the corresponding temple at the time of rotation of the temple in an expanding direction where the pair of the temples are expanded (in a direction where one temple is moved away from the other temple) is provided on each of the accommodating members. In this case, an angle corresponding to a maximum rotation of the temple in the expanding direction (an angle formed by the temple and a horizontal direction where the left eye and the right eye of an observer are positioned under the condition of the virtual image display worn by the observer, hereinafter referred to as an opening angle of the temple) is regulated by the contact member.

The accommodating member has the position control member which shifts the contact member in the first direction in which the contact member comes nearer to and away from the temple. In this case, the opening angle of the temple can be controlled by varying a contact position between the temple and the contact member in accordance with the shift of the contact member in the first direction by the function of the position control member.

Thus, the opening angle of the temple can be adjusted by the use of the contact member and the position control member. Accordingly, the virtual image display having this structure has high flexibility for use by various observers having different head sizes, and therefore becomes a highly convenient device for use.

Moreover, each of the temples is rotatably attached via the hinge mechanism to the accommodating member containing the image forming device.

According to this structure, the image forming device does not move along with the rotation of the temple when the temple is rotated. Thus, an appropriate positional relationship between the projection lens and the light guide member can be maintained, which allows the observer to observe an image in a preferable condition.

In the virtual image display of the above aspect, it is preferable that the light guide member is configured such that the light guide member guides the image light received from the image forming device toward the predetermined outside position and through which an external image can be observed.

According to this structure, the light guide member is a member constructed as above. Thus, the virtual image display becomes a see-through type which allows the observer to observe the external image as well as the image formed by the display element.

In the virtual image display of the above aspect, it is preferable that the position control members are movable in a second direction crossing the first direction, and connect with the corresponding contact members to shift the contact members in the first direction in accordance with the movement of the position control members in the second direction. In this case, each of the accommodating members or temples on which the contact member and the position control member are provided has a guide member which has a sliding surface extending in the second direction and allows the corresponding position control member to slide on the sliding surface such that the shift of the position control member can be guided in the second direction.

According to this structure, each of the contact members and the position control members shift in the first direction and the second direction crossing the first direction, respectively. Moreover, the guide member having the sliding surface is provided on each of the accommodating members.

In this case, the position control member can be pressed against the sliding surface in accordance with the press of the contact member by the temple at the time of rotation of the temple in the expanding direction. In this condition, movement of the position control member is stopped by the sliding surface extending in the second direction crossing the first direction where the contact member is pressed. Thus, shift of the position control member in the second direction along with the press of the contact member can be prevented.

Accordingly, the opening angle of the temple set by the change of the contact position between the contact member and the temple by the function of the position control member can be maintained at the desired angle, which further increases the degree of convenience in use of the virtual image display.

In the virtual image display of the above aspect, it is preferable that each of the hinge mechanisms includes a rotation shaft which rotates the corresponding temple with respect to the corresponding accommodating member, a support member provided on the corresponding accommodating member to support the corresponding rotation shaft, a shaft support member provided on the corresponding temple and having an insertion hole through which the rotation shaft is inserted such that the shaft support member can be rotatably supported by the rotation shaft, and an urging member which extends between the corresponding rotation shaft and the corresponding temple and urges the temple in the direction nearer to the rotation shaft. In this case, each of the insertion holes is a track hole which extends in a rotation direction around a virtual line passing through the contact position between the corresponding contact member and the corresponding accommodating member or temple on which the contact member and the position control member are not provided and extending in parallel with the rotation shaft.

According to this structure, the hinge mechanism constructed as above can press the temple by a predetermined force against the head of the observer wearing the virtual image display by utilizing the urging force of the urging member. In this case, the temple can be fitted to the head of the observer in a more preferable condition, which improves the sense of fitness of the virtual image display felt by the observer.

Moreover, the pressing force of the temple against the head of the observer can be adjusted by the change of the contact position between the temple and the contact member produced by the function of the position control member. The structure capable of controlling the pressing force by the observer's own operation further increases the degree of convenience in use of the virtual image display.

In the virtual image display of the above aspect, it is preferable that each of the contact members has a convex curved shape which forms the shape of a contact surface between the contact member and the corresponding accommodating member or temple on which the contact member and the position control member are not provided.

According to this structure, the surface of the contact member in contact with the temple is a convex curved surface. Thus, the temple can be rotated around the virtual line in a preferable condition.

In the virtual image display of the above aspect, it is preferable that the position control members are movable in the second direction crossing the first direction, and connect with the corresponding contact members to shift the contact members in the first direction in accordance with the movement of the position control members in the second direction. In this case, each of the accommodating members and temples on which the contact members and the position control members are provided has, in addition to the contact member and the position control member, an attachment member which attaches the corresponding contact member and the corresponding position control member to the corresponding accommodating member or temple on which the contact member and the position control member are provided. Moreover, each of the position control members and the attachment members has an engaging structure which positions the position control member at anyone of plural setting positions linearly disposed in the second direction by engagement between the corresponding position control member and the corresponding attachment member.

According to this structure, each of the position control members movable in the second direction shifts the contact member in accordance with the movement of the position control member in the second direction. Moreover, each of the position control members and the attachment members has the engaging structure which positions the position control member at any one of the plural setting positions linearly disposed in the second direction by engagement between the position control member and the attachment member.

In this case, when the position control member is pressed by the temple via the contact member by rotation of the temple in the expanding direction, shift of the position control member in the second direction can be prevented by the function of the engaging structure.

Therefore, the opening angle of the temple set after positioning the position control member at any of the setting positions by using the engaging structure can be maintained at the desired angle, hence the degree of convenience in use of the virtual image display further improves.

Furthermore, the plural setting positions for the position control member allow change of the opening angle of the temple in multiple steps, which further improves the convenience in use of the virtual image display.

In the virtual image display of the above aspect, it is preferable that each of the position control members includes a base which has an operation portion, a junction portion joined to the corresponding contact member, and a connection portion which connects the base and the junction portion. In this case, each of the engaging structures includes an engaging projection provided on the corresponding base, and a plurality of engagement receiving portions disposed on the corresponding attachment member in correspondence with the plural setting positions and engaging with the engaging projection. In addition, each of the connection portions is elastically deformable.

According to this structure, the engaging projection constituting the engaging structure is disposed on the base having the operation portion operated by the observer. Moreover, the position control member has the connection portion connecting the base and the junction portion and so constructed as to be elastically deformable in addition to the base and the junction portion.

According to this structure, the observer can set a disengagement condition between the engaging projection and the engagement receiving portions by operation of the operation portion for elastic deformation of the connection portion, that is, for allowing shift of the engaging projection (base). Moreover, the observer can return the connection portion to its original shape by stopping operation of the operation portion, that is, can set an engagement condition between the engaging projection and the engagement receiving portions by shifting the engaging projection (base).

Accordingly, the engagement condition or the disengagement condition can be established only by operation of the operation portion. This structure does not require an additional dedicated unit for setting the engagement condition and the disengagement condition, which contributes to simplification of the engaging structure.

In the virtual image display of the above aspect, it is preferable that each of the operation portions projects toward the outside from the inside of the corresponding accommodating member or temple on which the contact member and the position control member are provided. In this case, each of the connection portions extends in the direction perpendicular to a projection direction of the operation portion.

According to this structure, each of the connection portions extends in the direction explained above. In this case, the observer can easily achieve elastic deformation of the connection portion by pressing the operation portion in a direction opposite to its projection direction. That is, the observer can easily set the disengagement condition between the engaging projection and the engagement receiving portions.

When the length of the connection portion is appropriately adjusted, the force required for elastic deformation of the connection portion can be set at an appropriate force.

Accordingly, the maneuverability of the virtual image display for controlling the opening angle of the temple can improve.

In the virtual image display of the above aspect, it is preferable that each of the connection portions extends in the second direction.

According to this structure, an extending direction of each of the connection portions and the second direction are equalized, and set at a direction perpendicular to the projection direction of the operation portion.

In this case, the observer can set the disengagement condition between the engaging projection and the engagement receiving portions by pressing the operation portion in the direction opposite to its projection direction. Moreover, the observer can shift the position control member in the second direction, that is, moves the contact member along with the shift of the position control member only by shifting the operation portion in the direction perpendicular to its projection direction.

Accordingly, the maneuverability of the virtual image display for controlling the opening angle of the temple can further improve.

In the virtual image display of the above aspect, it is preferable that each of the operation portions projects toward the outside from the inside of the corresponding accommodating member or temple on which the contact member and the position control member are provided. In this case, the plural engagement receiving portions have plural projections linearly disposed in the second direction. In addition, the plural projections project in the direction opposite to the projection direction of the corresponding operation portion.

According to this structure, the plural engagement receiving portions include the plural projections disposed in a line in the second direction. Thus, the engagement condition can be set by insertion of the engaging projection between the adjoining projections or other positions. The plural projections project in the direction opposite to the projection direction of the operation portion.

In this case, the observer can easily set the disengagement condition in which the engaging projection shifts outward from a space between the adjoining projections only by pressing the operation portion in the direction opposite to the projection direction of the operation portion.

Accordingly, the maneuverability of the virtual image display for controlling the opening angle of the temple can further improve.

In the virtual image display of the above aspect, it is preferable that each of the temples has a cushion member which expands toward the other temple.

According to this structure, the cushion member is provided on each of the temples. In this case, the observer wearing the virtual image display can tightly fit the cushion members to the head of the observer by deformation of the cushion members in accordance with the shape of the head.

Accordingly, the sense of fitness of the virtual image display felt by the observer can further improve.

BRIEF DESCRIPTION OF THE DRAWINGS

The invention will be described with reference to the accompanying drawings, wherein like numbers reference like elements.

FIG. 13A illustrates the operation of the control mechanism according to the second embodiment, showing the action of a connection portion at the time of shift of an engaging projection from a first setting position to a second setting position.

FIG. 13B illustrates the operation of the control mechanism according to the second embodiment, showing the action of the connection portion at the time of shift of the engaging projection from the first setting position to the second setting position.

FIG. 13C illustrates the operation of the control mechanism according to the second embodiment, showing the action of the connection portion at the time of shift of the engaging projection from the first setting position to the second setting position.

DESCRIPTION OF EXEMPLARY EMBODIMENTS

First Embodiment

A first embodiment according to the invention is hereinafter described with reference to the drawings.

1. Structure of Virtual Image Display

Figure 1:
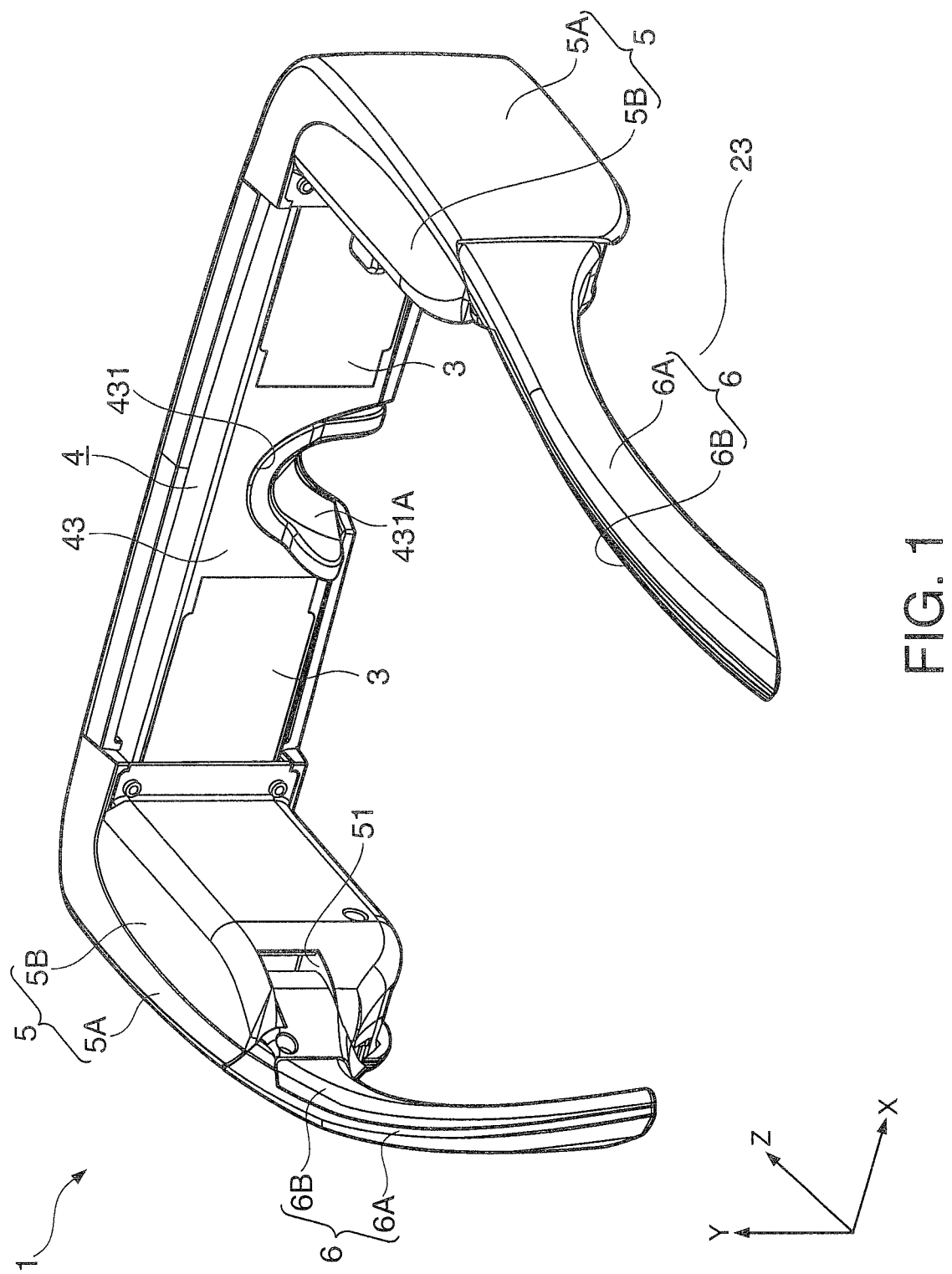
FIG. 1 is a perspective view illustrating the external appearance of a virtual image display according to a first embodiment.

FIG. 1 is a perspective view illustrating the external appearance of a virtual image display 1.

Figure 2:
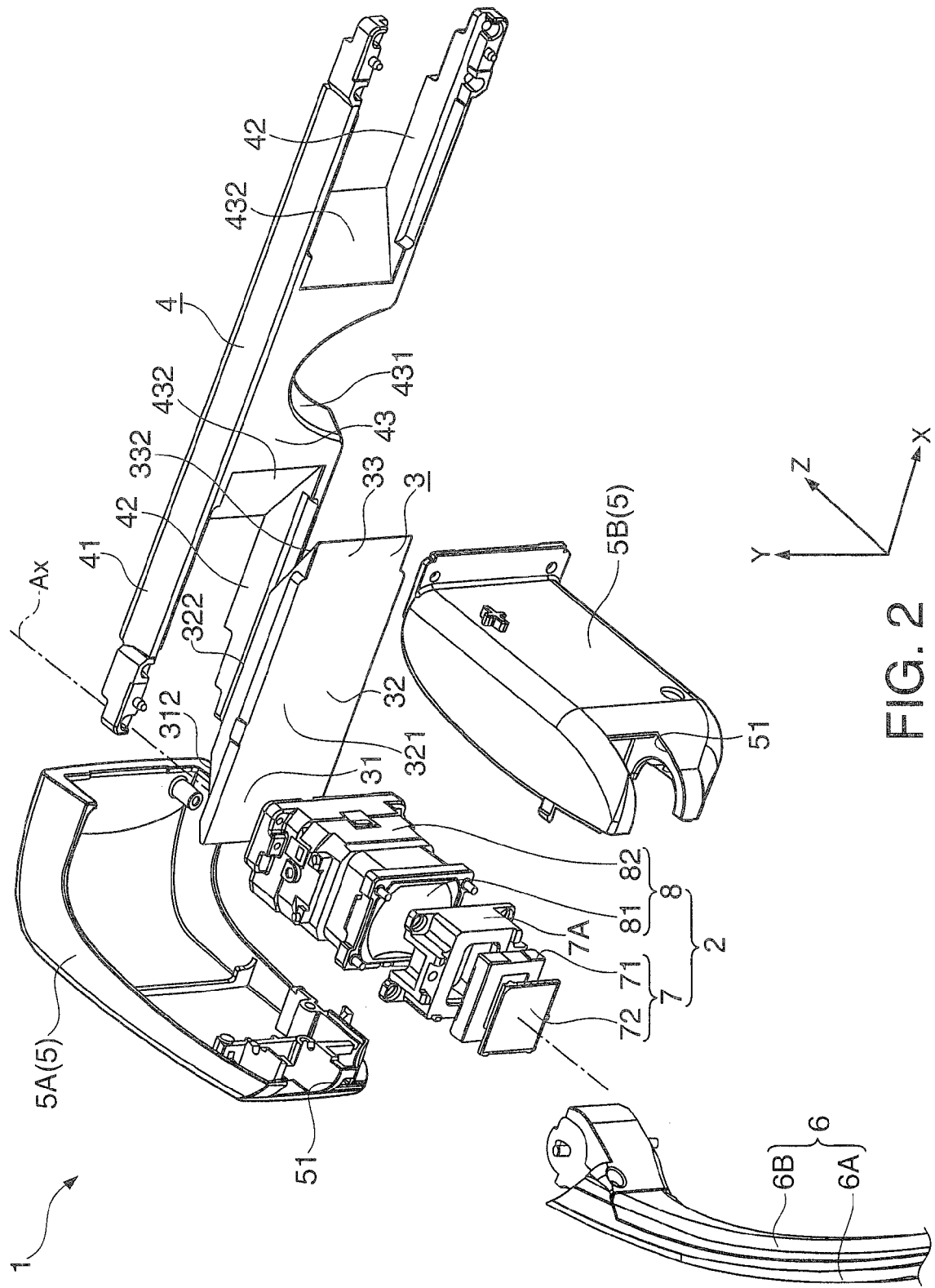
FIG. 2 is a perspective view illustrating the structure of the virtual image display in a disassembled condition according to the first embodiment.

FIG. 2 is a perspective view illustrating the structure of the virtual image display 1 in a disassembled condition.

Figure 3:
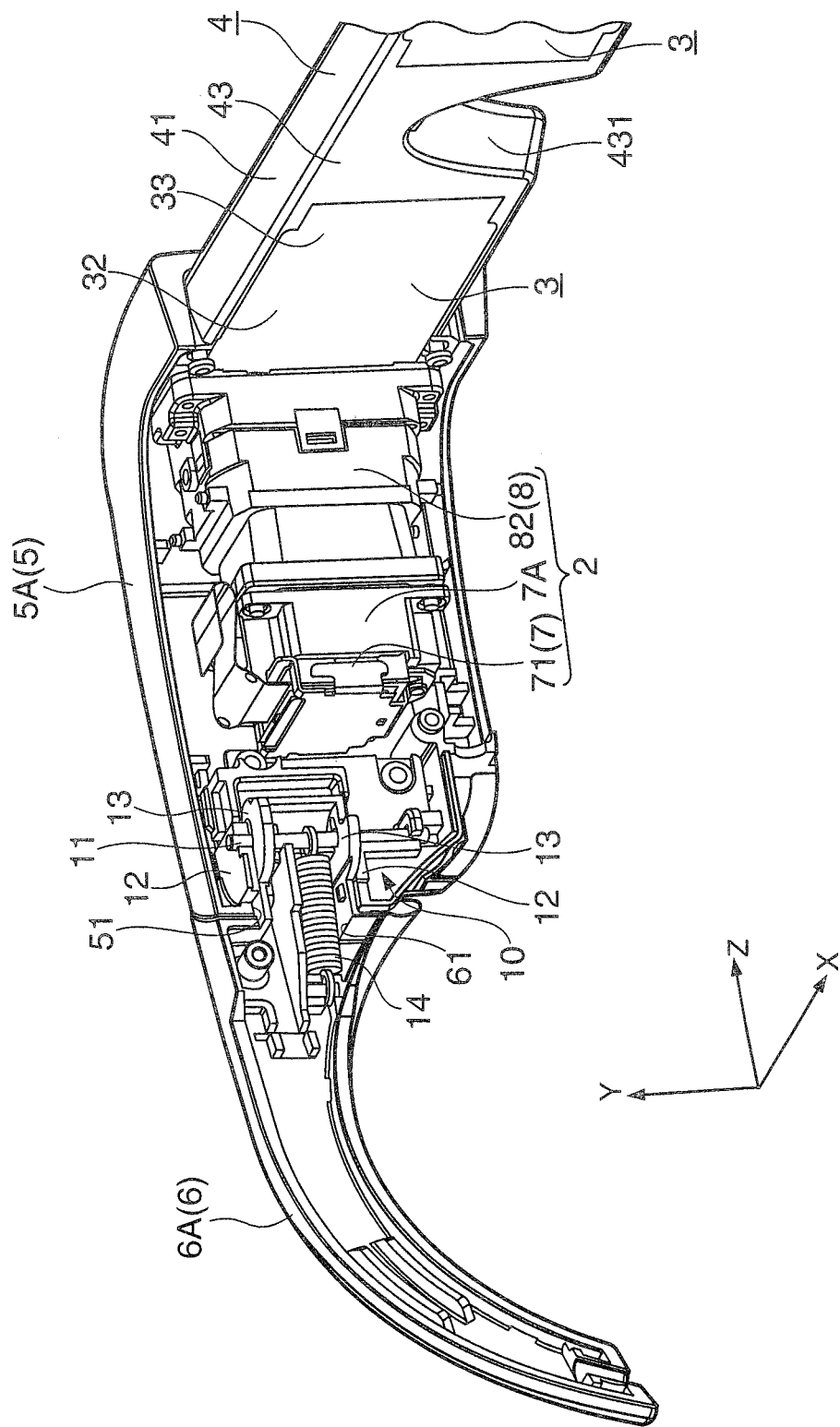
FIG. 3 is a perspective view illustrating the internal structure of the virtual image display according to the first embodiment.

FIG. 3 is a perspective view illustrating the internal structure of the virtual image display 1.

In FIGS. 1 through 3, a Z axis corresponds to an axis extending in parallel with an optical axis Ax (FIG. 2) of a projection lens 81 (described later), an X axis corresponds to a horizontal axis crossing the Z axis at right angles, and a Y axis corresponds to a vertical axis crossing the Z axis at right angles for convenience of explanation. These definitions are applicable to the other figures referred to later as well. Furthermore, the −Z axis side corresponds to the side nearer to an observer, while the +Z axis side corresponds to the side away from the observer.

FIGS. 1 through 3 are illustrations as viewed from the −Z axis side. FIGS. 2 and 3 show only a part associated with the left eye of the observer for convenience of explanation.

As illustrated in FIGS. 1 through 3, the virtual image display 1 is a head mount display having an external appearance similar to that of spectacles, as a device on which the observer can recognize a virtual image corresponding to image light. Moreover, the virtual image display 1 in this embodiment is a see-through type virtual image display through which an outside image can be observed as a see-through image.

As illustrated in FIGS. 1 through 3, the virtual image display 1 includes image forming devices 2 (FIGS. 2 and 3), light guide members 3, a rim 4 and covers 5 as accommodating members, and temples 6.

The "rim" and the "temple" are technical terms referring to components of spectacles. According to this embodiment, the "rim" supports the light guide members corresponding to lenses of the spectacles, while the "temple" is a part fitted to the ear of the observer. The details of these components will be described later.

As illustrated in FIGS. 1 through 3, the image forming device 2, the light guide member 3, the cover 5, and the temple 6 are provided for each of the left and right eyes of the observer wearing the virtual image display 1. Each pair of these components 2, 3, 5, and 6 are symmetrically disposed with respect to a Y-Z plane (symmetric in the left-right direction).

The respective structures of the image forming device 2, the light guide member 3, the cover 5, and the temple 6 provided for the right eye are similar to the structures of the corresponding components for the left eye. Thus, only the structures associated with the left eye of the observer are now explained.

2. Structure of Image Forming Device

The image forming device 2 as a unit for forming and projecting image light includes a display element 7 and a projection unit 8 as illustrated in FIGS. 2 and 3.

As can be seen from FIGS. 2 and 3, the display element 7 has a transmission-type liquid crystal display device 71 which modulates received light to form image light, and a backlight 72 (FIG. 2) attached to the light entrance side of the liquid crystal display device 71 to emit light toward the liquid crystal display device 71.

As illustrated in FIGS. 2 and 3, the projection unit 8 has the projection lens 81 (FIG. 2) which converts image light received from the display element 7 into collimated light and projects the collimated light, and a lens barrel 82 which accommodates the projection lens 81.

As illustrated in FIGS. 2 and 3, the display element 7 is fixed to a −Z axis side end surface of the lens barrel 82 via a fixing member 7A.

As illustrated in FIG. 3, the image forming device 2 constituted by the respective components 7 and 8 combined into one body is fixed to the rim 4 via the lens barrel 82.

3. Structure of Light Guide Member

Figure 4A:
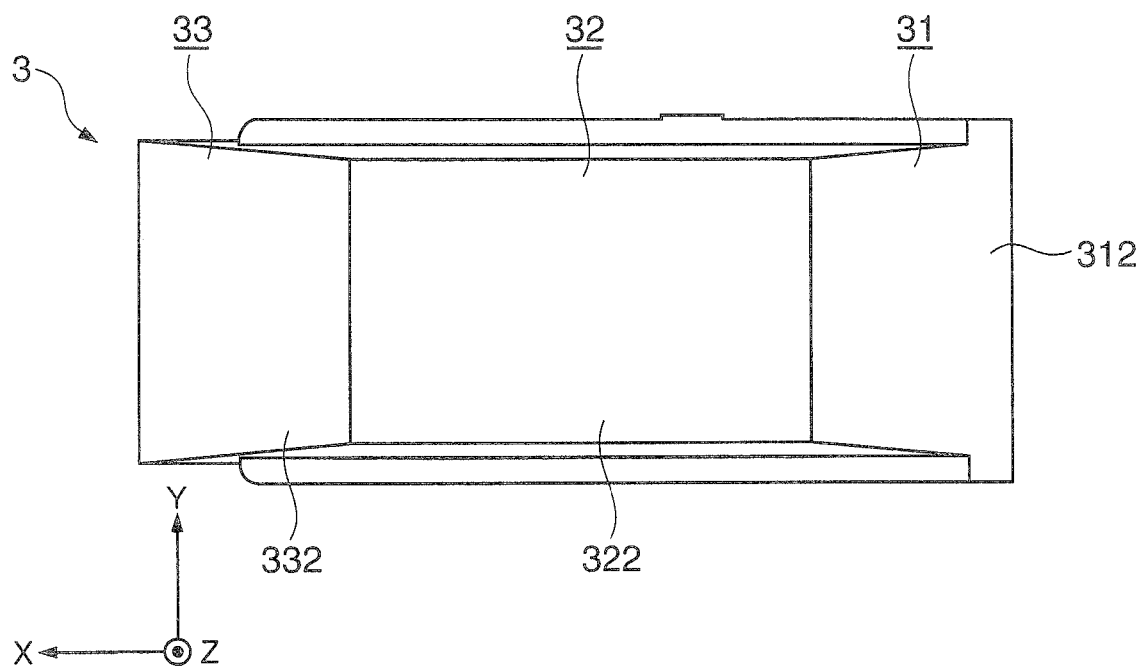
FIG. 4A illustrates the structure of a light guide member according to the first embodiment as viewed from the +Z axis side.
Figure 4B:
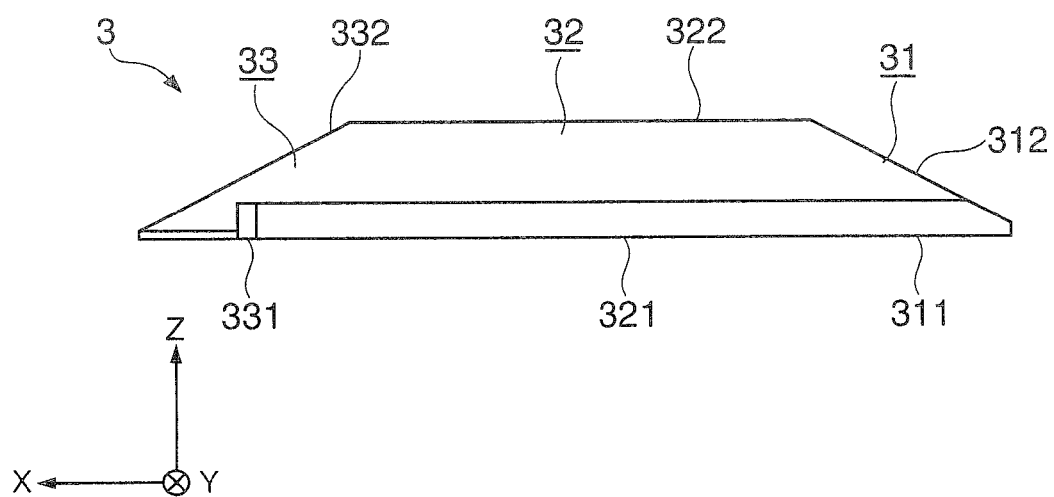
FIG. 4B illustrates the structure of the light guide member according to the first embodiment as viewed from below in a direction along a Y axis.

FIG. 4A illustrates the structure of the light guide member 3 as viewed from the +Z axis side. FIG. 4B illustrates the structure of the light guide member 3 as viewed from below in a direction along the Y axis.

The light guide member 3 made of light-transmissive resin material or the like introduces image light projected from the image forming device 2 into the interior of the light guide member 3, and guides the image light toward a predetermined position outside the light guide member 3 (left eye or right eye of the observer).

As illustrated in FIGS. 2, 4A and 4B, the light guide member 3 is constituted by an image inlet portion 31, a total reflection portion 32, and an image outlet portion 33 formed integrally with each other, and has a substantially isosceles trapezoidal shape as viewed in the direction along the Y axis.

As illustrated in FIGS. 2, 4A and 4B, the image inlet portion 31 has a substantially triangle pole shape extending along the Y axis, and is disposed on the side away from the other light guide member 3 in the assembled condition of the virtual image display 1.

The image inlet portion 31 is disposed opposed to the projection unit 8 in the assembled condition of the virtual image display 1 to introduce the image light projected from the projection unit 8 into the interior of the light guide member 3.

As illustrated in FIGS. 4A and 4B, a light entrance surface 311 and a first reflection surface 312 are provided on an outside surface of the image inlet portion 31.

The light entrance surface 311 has a flat shape extending in parallel with an X-Y plane, and is disposed opposed to the projection lens 81 to receive the image light projected from the projection lens 81.

The first reflection surface 312 is constituted by a film disposed on a flat slope of the image inlet portion 31 inclined to the X-Y plane and opposed to the light entrance surface 311, as a film formed by deposition of aluminum or by other methods.

The first reflection surface 312 reflects the image light introduced into the image inlet portion 31 through the light entrance surface 311 such that the image light can reach the total reflection portion 32.

As illustrated in FIGS. 2, 4A and 4B, the total reflection portion 32 has a rectangular plate shape extending along the X-Y plane, and is formed integrally with the image inlet portion 31.

As illustrated in FIGS. 4A and 4B, the total reflection portion 32 has first and second total reflection surfaces 321 and 322 to guide the image light reflected by the first reflection surface 312 such that the image light can travel in a direction away from the image inlet portion 31 (toward the other light guide member 3) by total reflection on the first and second total reflection surfaces 321 and 322.

The first total reflection surface 321 is constituted by a flat surface continuing from the light entrance surface 311 (extending in parallel with the X-Y plane, i.e., crossing the optical axis Ax at right angles), and disposed on the −Z axis side with reflect to the second total reflection surface 322.

The second total reflection surface 322 has a flat shape extending in parallel with the first total reflection surface 321.

The first and second total reflection surfaces 321 and 322 are not limited to the structures which guide the image light by total reflection on an interface between the air and the reflection surfaces without the aid of mirrors or half-mirrors provided on the surfaces, but may be structures which have mirror coating or half-mirror film on the entire area or a partial area of the first and second total reflection surfaces 321 and 322. For example, the first and second total reflection surfaces 321 and 322 may have mirror coating or the like on the entire area or a partial area of the first and second total reflection surfaces 321 and 322 to reflect substantially all the image light on the assumption that an incident angle of the image light satisfies total reflection conditions. When the image light has sufficient brightness, the entire area or a partial area of the first and second total reflection surfaces 321 and 322 may be coated with a mirror having a certain degree of light transmissivity.

As illustrated in FIGS. 2, 4A and 4B, the image outlet portion 33 has a substantially triangle pole shape extending along the Y axis similarly to the image inlet portion 31. The image outlet portion 33 is formed integrally with the total reflection portion 32, and disposed on the side nearer to the other light guide member 3 in the assembled condition of the virtual image display 1.

The image outlet portion 33 guides the image light received from the total reflection portion 32 such that the image light can reach the predetermined position outside the virtual image display 1 (toward the left eye or the right eye of the observer).

As illustrated in FIGS. 4A and 4B, a light exit surface 331 and a second reflection surface 332 are provided on an outside surface of the image outlet portion 33.

The light exit surface 331 is a flat surface continuing from the first total reflection surface 321.

The second reflection surface 332 disposed opposed to the light exit surface 331 has a flat shape inclined to the X-Y plane to guide the image light received from the total reflection portion 32 such that the image light can reach the predetermined position outside the virtual image display 1 (toward the left eye or the right eye of the observer).

The second reflection surface 332 is constituted by a half-mirror or the like, and so constructed as to reflect the image light and transmit an external image.

The image outlet portion 33 is not limited to the structure which includes the second reflection surface 332 provided with the half-mirror or the like, but may be constituted by a polarization beam splitter, a hologram diffraction grating or the like as long as it can guide the image light received from the total reflection portion 32 toward the predetermined outside position.

4. Structure of Rim

The rim 4 made of light-transmissive resin or other materials has a symmetric shape in the left-right direction. The rim 4 holds the pair of the light guide members 3 (combines the light guide members 3) in such a condition that the image outlet portions 33 of the pair of the light guide members 3 come close to each other.

As illustrated in FIG. 2, the rim 4 includes an upper frame 41, a pair of lower frames 42, and an intermediate portion 43, all of which components 41 through 43 are formed integrally with each other.

The upper frame 41 is a component which has a substantially rectangular cross-sectional shape extending along the X axis and supports upper parts of the pair of the light guide members 3.

Each of the pair of the lower frames 42 has a substantially rectangular cross-sectional shape extending along the X axis. The lower frames 42 are provided below the upper frame 41, and disposed in a line in the X axis direction to support lower parts of the pair of the light guide members 3.

Each of the image forming devices 2 containing the respective components 7 and 8 as one body is fixed to the upper frame 41 and the lower frame 42 via the lens barrel 82.

The intermediate portion 43 is positioned at the center of the rim 4, and extended between the upper frame 41 and the pair of the lower frames 42.

As illustrated in FIGS. 1 through 3, the intermediate portion 43 has a notch 431 having a substantially circular-arc shape as viewed in a direction along the Z axis, and extending upward from a position between the pair of the lower frames 42.

A nose pad 431A (FIG. 1) detachably attached to the notch 431 contacts the nose of the observer when the observer wears the virtual image display 1.

As illustrated in FIG. 2, a slope 432 configured to follow the shape of the second reflection surface 332 of the corresponding light guide member 3 is provided at each of −Z axis side left and right ends of the intermediate portion 43.

Each of the light guide members 3 is fitted into a U-shaped inner space surrounded by the upper frame 41, the lower frame 42, and the intermediate portion 43, and bonded to the upper frame 41, the lower frame 42, and the slope 432 by an adhesive.

5. Structure of Cover

As illustrated in FIGS. 1 through 3, the cover 5 includes a first cover 5A disposed on the side away from the other cover 5 and a second cover 5B disposed on the side nearer to the other cover 5, both combined into one body. The cover 5 is a hollow component having a substantially rectangular parallelepiped shape on the whole and extending along the Z axis.

The cover 5 is fixed to the upper frame 41 and the lower frame 42 of the rim 4 to cover the image forming device 2, a part of the light guide member 3 (the image inlet portion 31), and a part of the rim 4 (ends of the upper frame 41 and the lower frame 42).

As illustrated in FIGS. 1 through 3, a first attachment hole 51 through which the inside and the outside of the cover 5 communicate with each other is provided substantially at the center of the cover 5 in the Y axis direction at a −Z axis side end thereof.

6. Structure of Temple

As illustrated in FIGS. 1 through 3, the temple 6 includes a first temple 6A disposed on the side away from the other temple 6 and a second cover 6B disposed on the side nearer to the other temple 6, both combined into one body. The temple 6 is a hollow component extending in a curved shape.

One end (+Z axis side end) of the temple 6 is rotatably attached to the cover 5 via a hinge mechanism 10 (described later), and fitted to the ear of the observer when the observer wears the virtual image display 1.

According to this embodiment, the temple 6 is gradually curved downward in a direction from the one end to the other end while extending toward the −Z axis side under the condition shown in FIG. 1 (in a state where a first contact portion 21 (described later) is shifted toward the +Z axis side to the maximum), and also gradually curved toward the side nearer to the other temple 6.

In other words, the temple 6 is configured to follow the shape of the head of the observer when the virtual image display 1 is worn by the observer.

As illustrated in FIG. 3, a second attachment hole 61 is formed at the one end of the temple 6 at a position substantially at the center thereof in the direction along the Y axis. The second attachment hole 61 through which the inside and the outside of the temple 6 can communicate with each other is disposed at a position corresponding to a position of the first attachment hole 51 of the cover 5.

The second attachment hole 61 is produced by junction between the first and second temples 6A and 6B. FIG. 3 illustrates only a part of the second attachment hole 61 formed in the first temple 6A.

7. Structure of Hinge Mechanism

Figure 5:
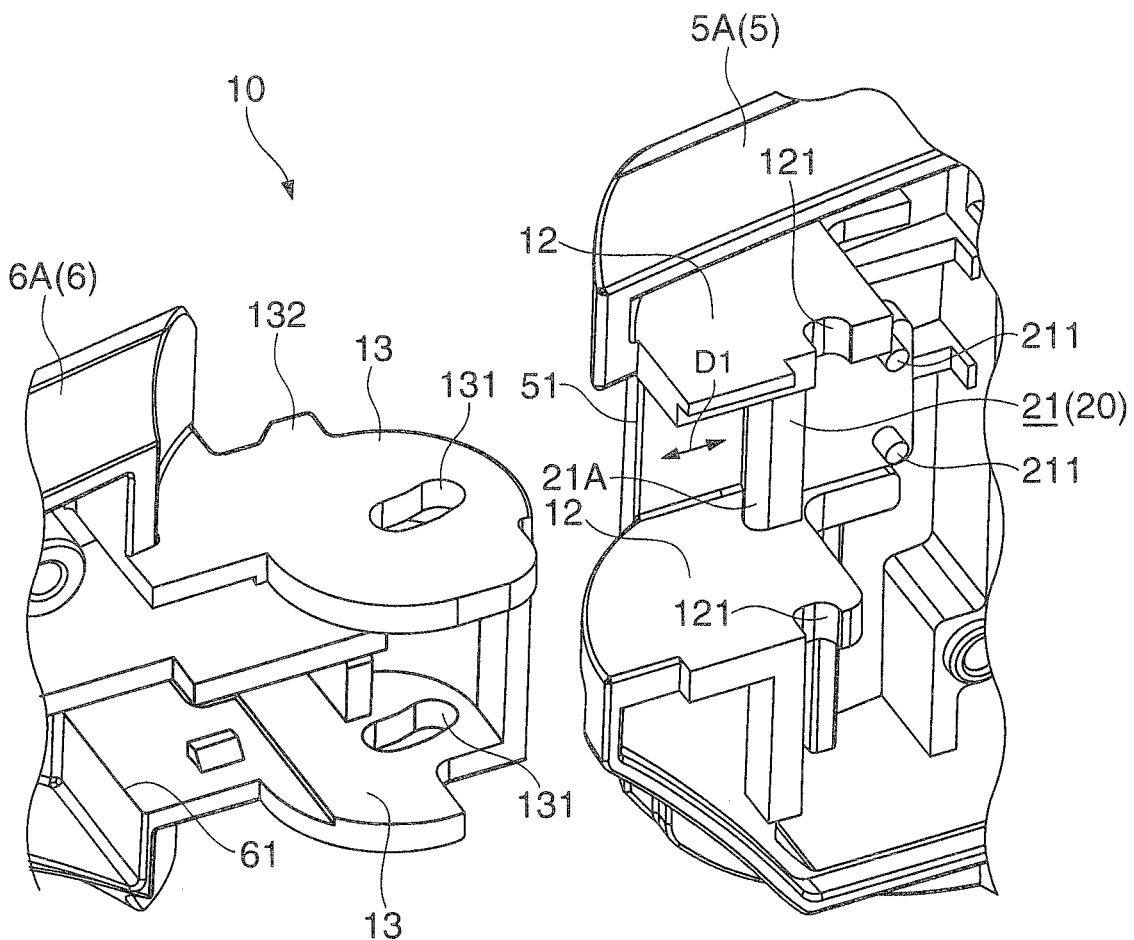
FIG. 5 is a perspective view illustrating a hinge mechanism in a disassembled condition according to the first embodiment.

FIG. 5 is a perspective view illustrating the structure of the hinge mechanism 10 in a disassembled condition.

As illustrated in FIGS. 3 and 5, the hinge mechanism 10 includes a rotation shaft 11 (FIG. 3), a pair of support members 12, a pair of shaft support members 13, and an urging member 14 (FIG. 3).

As illustrated in FIG. 3, the rotation shaft 11 is a cylindrical shaft provided to rotate the temple 6 with respect to the cover 5.

As illustrated in FIGS. 3 and 5, the pair of the support members 12 are equipped on the cover 5.

More specifically, each of the pair of the support members 12 has a plate shape projecting in a direction parallel with an X-Z plane toward the inside of the cover 5 from an edge of the first attachment hole 51 of the cover 5. The pair of the support members 12 are disposed in a line in the direction along the Y axis.

As illustrated in FIG. 5, each of the pair of the support members 12 has a support hole 121 on which the rotation shaft 11 is supported.

Each of the pair of the support members 12 (support holes 121) is produced by junction between the first and second covers 5A and 5B. FIGS. 3 and 5 illustrate only a part of the pair of the support members 12 (support holes 121) formed on the first cover 5A.

The pair of the support members 12 support the rotation shaft 11 via the support holes 121 in the direction along the Y axis.

As illustrated in FIG. 5, the first contact portion 21 constituting a control mechanism 20 (described later) is equipped on the first cover 5A at a position between the pair of the support members 12.

The detailed structure of the control mechanism 20 will be described later.

As illustrated in FIGS. 3 and 5, the pair of the shaft support members 13 are provided on the temple 6.

More specifically, each of the pair of the shaft support members 13 has a substantially disk shape projecting in the direction parallel with the X-Z plane toward the outside from an edge of the second attachment hole 61 of the first temple 6A. The pair of the shaft support members 13 are disposed in a line in the direction along the Y axis.

The distance length between the pair of the shaft support members 13 is shorter than the distance length between the pair of the support members 12.

The pair of the shaft support members 13 are inserted through the first attachment holes 51 into a space between the pair of the support members 12 by junction between the temple 6 and the cover 5.

As illustrated in FIG. 5, each of the pair of the shaft support members 13 has an insertion hole 131 through which the rotation shaft 11 is inserted.

Each of the insertion holes 131 is a track hole (long hole) extending in a rotation direction around a virtual line VA (see FIGS. 6A and 6B) which passes through a contact surface 21A of the first contact portion 21 (contact position between the first contact portion 21 and a second contact portion 132 (FIG. 5) described later) and extends in parallel with the Y axis under the condition of junction between the cover 5 and the temple 6.

The temple 6 attached to the cover 5 via the hinge mechanism 10 thus constructed rotates around the rotation shaft 11 (shaft extending along the Y axis) in an expanding direction (toward the side away from the other temple 6) or in a contracting direction (toward the side nearer to the other temple 6).

As illustrated in FIG. 5, the second contact portion 132 is provided on each of the pair of the shaft support members 13 of the temple 6 on the side opposite to the other temple 6 with respect to the insertion hole 131 as viewed in the direction along the Y axis.

Each of the second contact portions 132 is a portion projecting from an outer edge of the corresponding shaft support member 13 and contacting the first contact portion 21 (the contact surface 21A) when the temple 6 is rotated in the expanding direction.

Figure 6A:
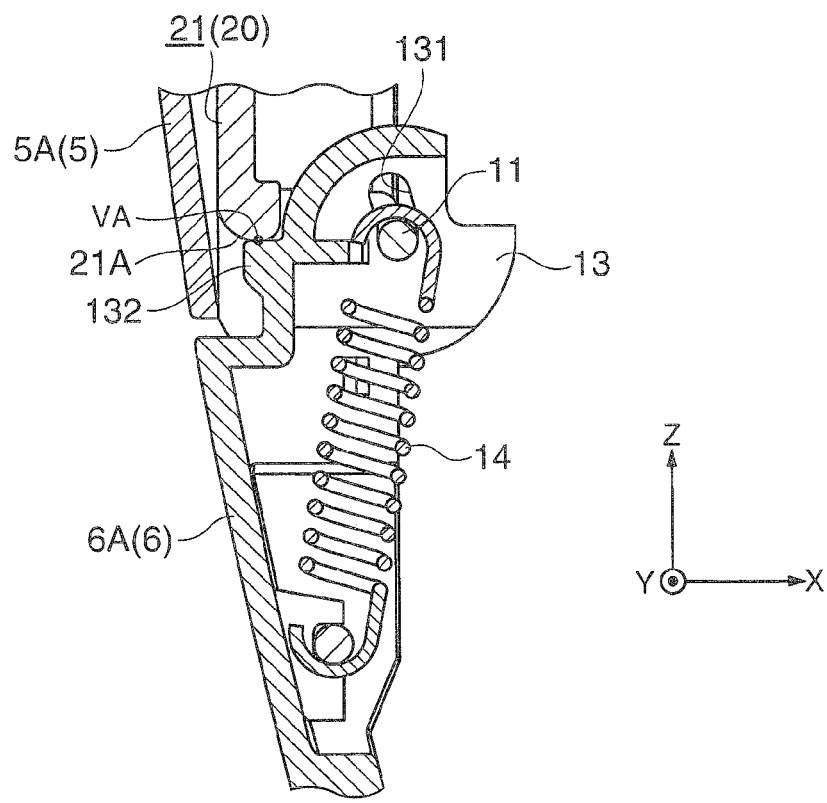
FIG. 6A illustrates the function of an urging member according to the first embodiment, showing the urging member under a condition in which first and second contact portions contact each other.
Figure 6B:
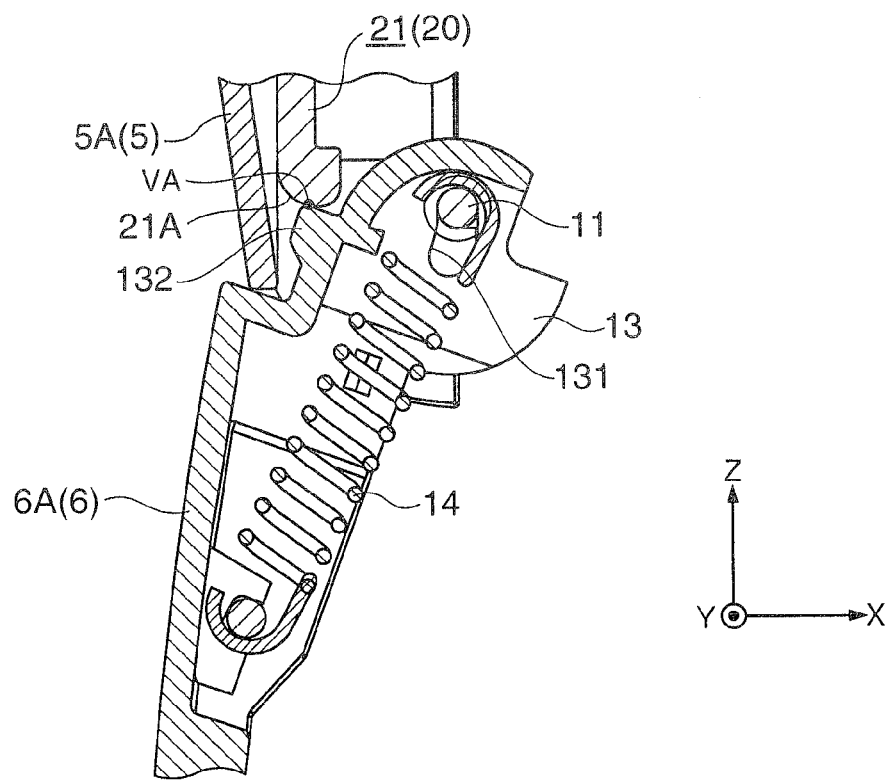
FIG. 6B illustrates the function of the urging member according to the first embodiment, showing the urging member under a condition in which the first and second contact portions contacting each other are further shifted by rotation of a temple in its expanding direction.

FIG. 6A illustrates the function of the urging member 14, showing the urging member 14 under a condition in which the first and second contact portions 21 and 132 contact each other. FIG. 6B illustrates the function of the urging member 14, showing the urging member 14 under a condition in which the first and second contact portions 21 and 132 contacting each other are further rotated in the expanding direction of the temple 6. FIGS. 6A and 6B are cross-sectional views of the hinge mechanism 10 taken along the X-Z plane.

As illustrated in FIGS. 3, 6A and 6B, the urging member 14 is constituted by a tension coil spring. One and the other ends of the urging member 14 are attached to the rotation shaft 11 and the first temple 6A, respectively, such that the temple 6 can be urged toward the rotation shaft 11 (in the contracting direction of the temple 6).

The temple 6 is rotated in the following manner with the aid of the urging member 14.

By rotation of the temple 6 in the expanding direction around the rotation shaft 11, the second contact portion 132 comes into contact with the first contact portion 21 (FIG. 6A).

By further press of the temple 6 under the condition shown in FIG. 6A in the expanding direction, the temple 6 rotates around the virtual line VA along with the positional change of the rotation shaft 11 within the insertion hole 131 while resisting the urging force of the urging member 14.

Accordingly, the temple 6 of the virtual image display 1 while worn by the observer applies a predetermined force generated by the urging force of the urging member 14 to the head of the observer.

8. Structure of Control Mechanism

Figure 7:
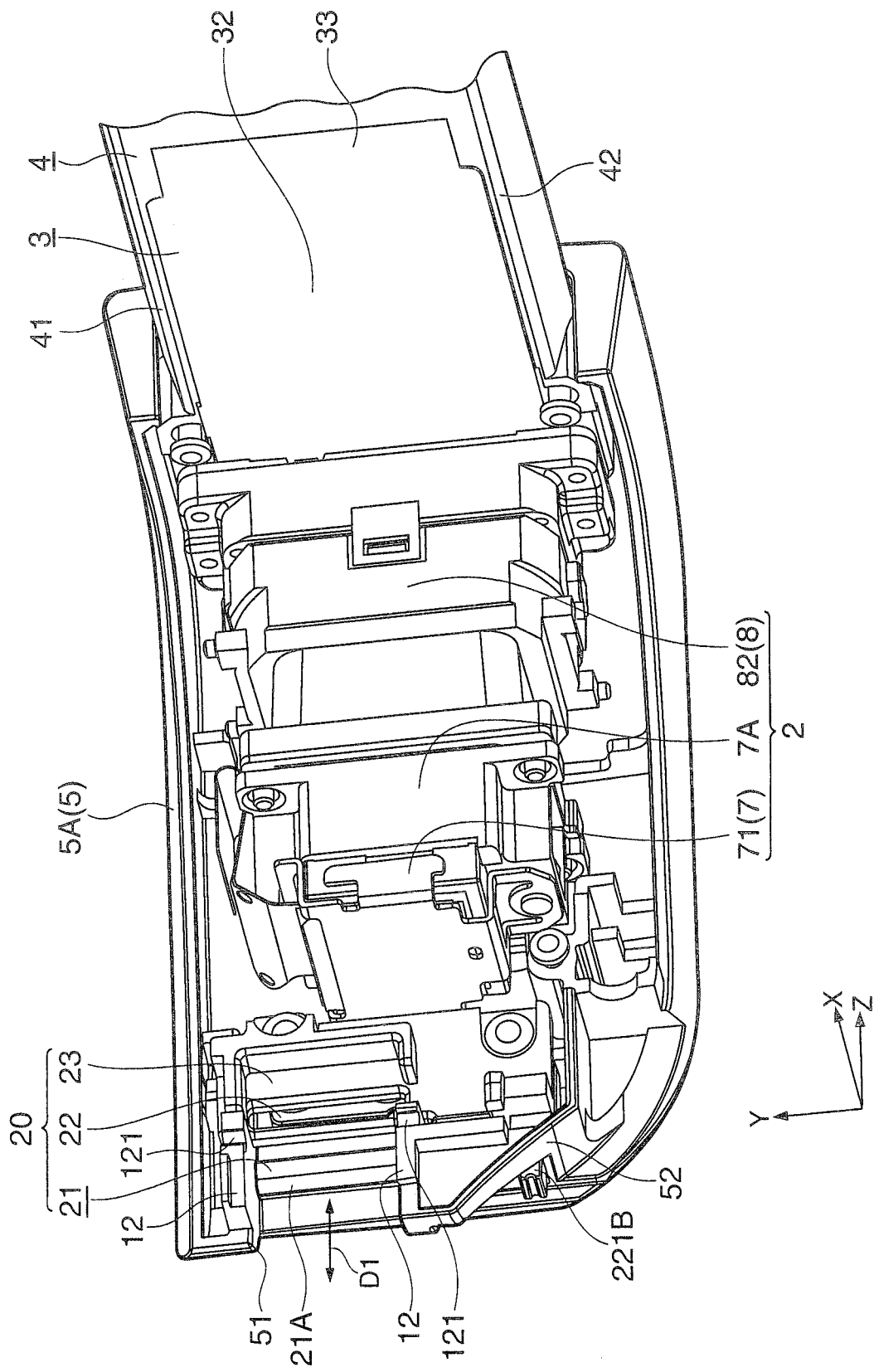
FIG. 7 illustrates the structure of a control mechanism according to the first embodiment.
Figure 8A:
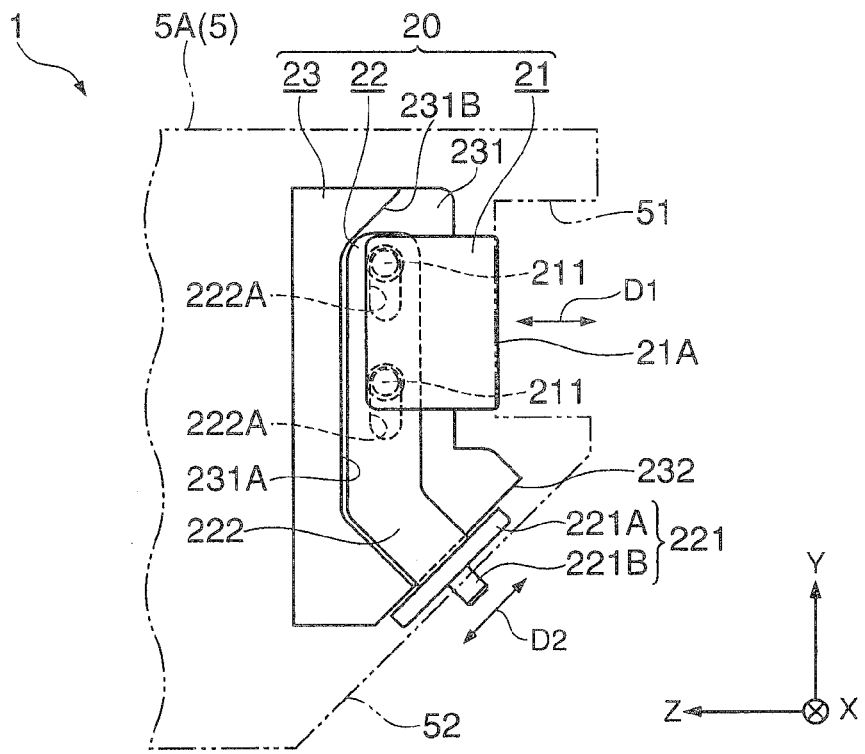
FIG. 8A illustrates the structure of the control mechanism according to the first embodiment as viewed on the side away from a cover as an opposite cover.
Figure 8B:
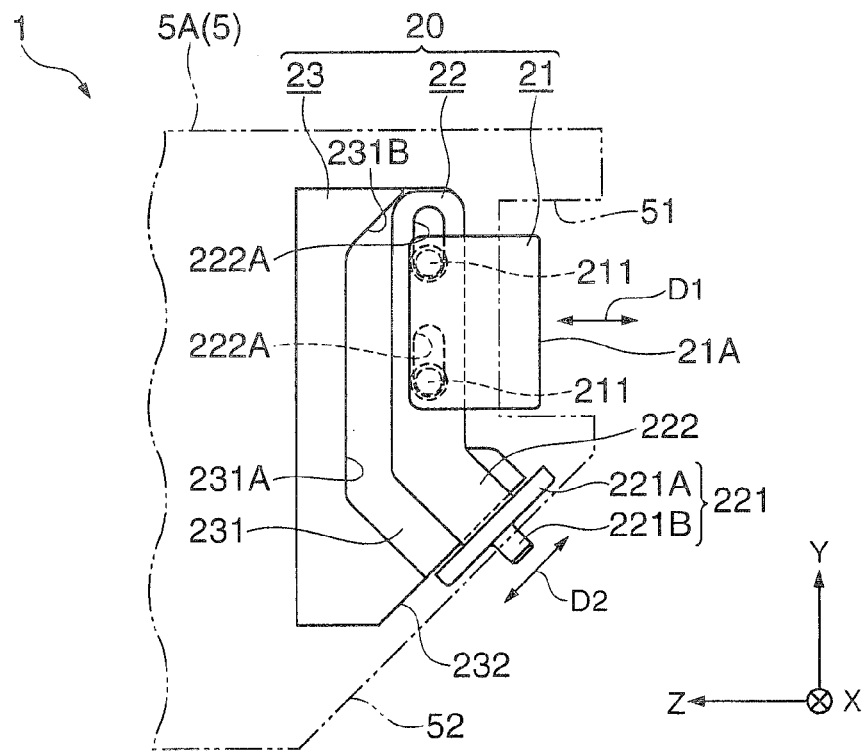
FIG. 8B illustrates the structure of the control mechanism according to the first embodiment as viewed on the side away from the cover as the opposite cover.
Figure 9A:
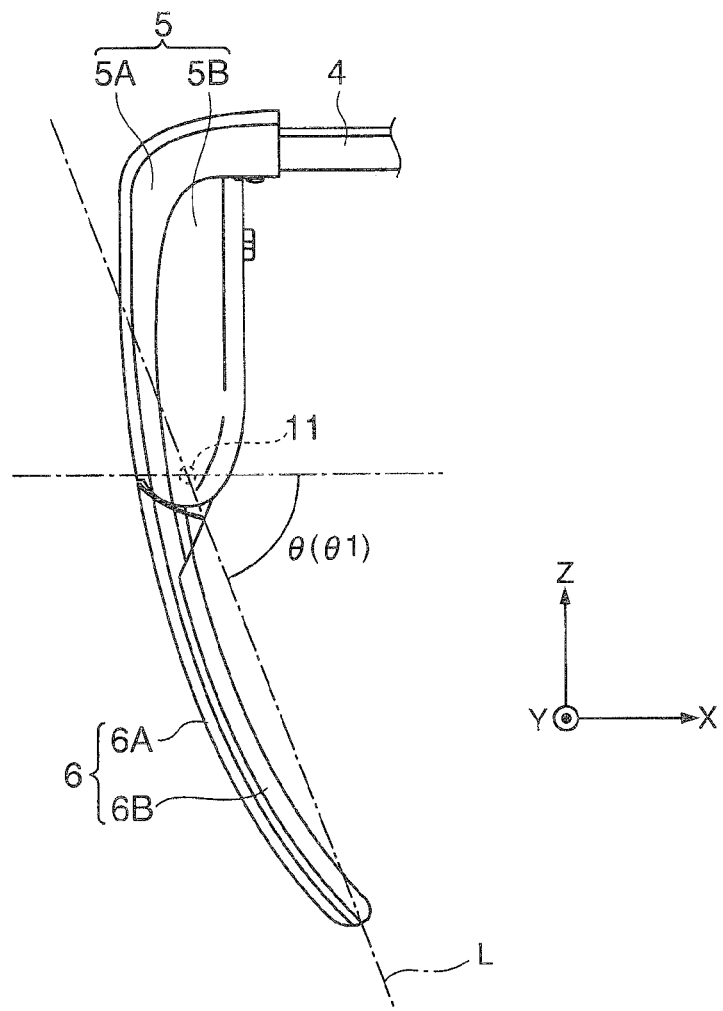
FIG. 9A illustrates the structure of the control mechanism in the first embodiment, showing an opening angle of the temple under a condition in which the second contact portion contacts the first contact portion by rotation of the temple in the expanding direction around a rotation shaft.
Figure 9B:
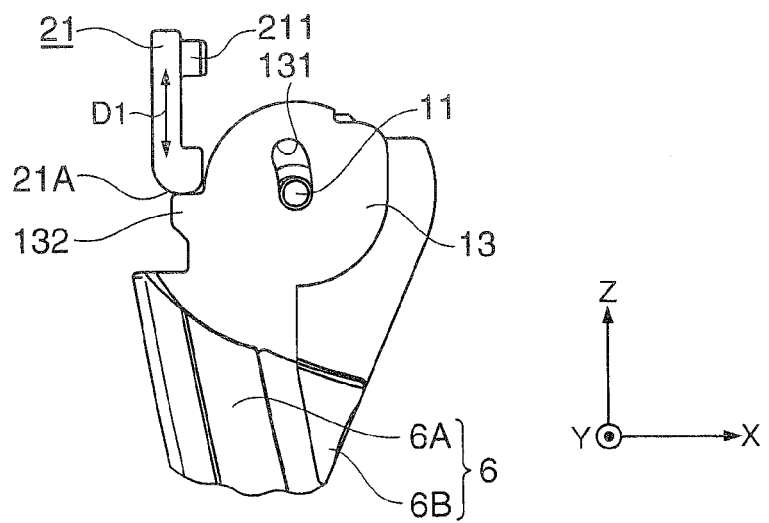
FIG. 9B illustrates a condition in which the first and second contact portions contact each other shown in FIG. 9A as viewed from above.
Figure 10A:
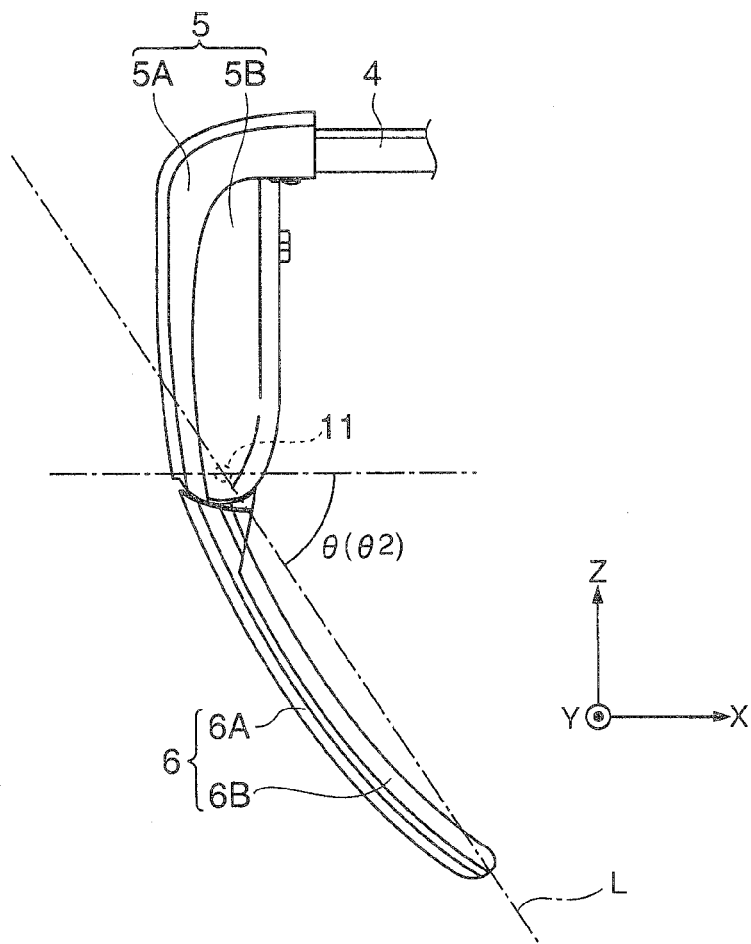
FIG. 10A illustrates the structure of the control mechanism in the first embodiment, showing an opening angle of the temple under the condition in which the second contact portion contacts the first contact portion by rotation of the temple in the expanding direction around the rotation shaft.
Figure 10B:
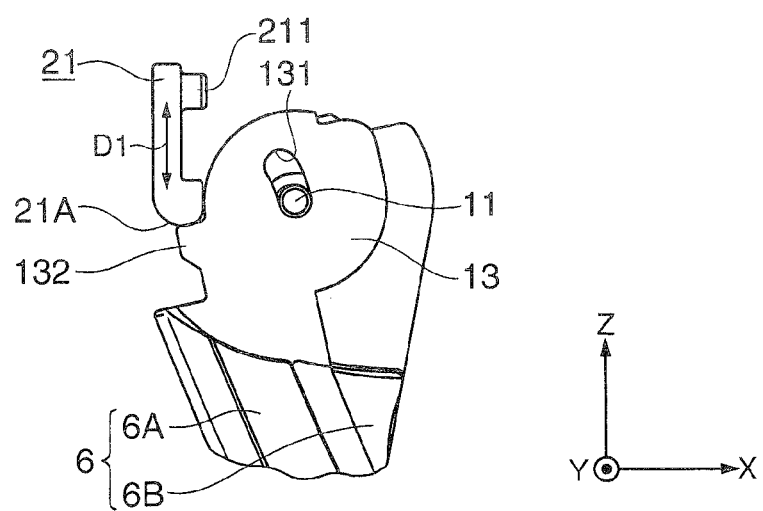
FIG. 10B illustrates the condition in which the first and second contact portions contact each other shown in FIG. 10A as viewed from above.

FIGS. 7, 8A, 8B, 9A, 9B, 10A, and 10B illustrate the structure of the control mechanism 20. More specifically, FIG. 7 is a perspective view of the control mechanism 20 attached to an inner surface of the first cover 5A as viewed from the side nearer to the other cover 5. FIGS. 8A and 8B schematically illustrate the structure of the control mechanism 20 as viewed from the side away from the other cover 5. FIGS. 9A and 10A show an opening angle θ of the temple 6 rotated in the expanding direction around the rotation shaft 11 to come into the condition where the second contact portion 132 contacts the first contact portion 21. FIG. 9B and 10B illustrate the first and second contact portions 21 and 132 contacting each other in the condition of FIGS. 9A and 10A as viewed from above.

The control mechanism 20 is a mechanism for controlling the opening angle θ of the temple 6.

The opening angle θ of the temple 6 is a maximum rotation angle of the temple 6 in the expanding direction around the rotation shaft 11, and is defined as an angle θ formed by the X axis and the temple 6 (a line L connecting the rotation shaft 11 and the other end of the temple 6) as illustrated in FIG. 9A, for example.

As illustrated in FIGS. 7, 8A and 8B, the control mechanism 20 includes the first contact portion 21 as a contact member, a control lever 22 as a position control member, and a guide member 23.

As illustrated in FIGS. 5 through 7, 8A, 8B, 9B, and 10B, the first contact portion 21 has a substantially rectangular plate shape extending along the Y-Z plane. The first contact portion 21 disposed between the pair of the support members 12 is movable in a first direction D1 (in a direction nearer to and away from the temple 6 in FIGS. 5, 7, 8A, 8B, 9B, and 10B) but not movable in the direction along the Y axis by the regulation of the respective support members 12.

According to this embodiment, the first direction D1 extends in parallel with the Z axis.

As illustrated in FIGS. 6A and 6B, the first contact portion 21 has a convex and curved configuration which has a −Z axis side end convexed toward the −Z axis side, and a substantially circular-arc cross section extending along the X axis as viewed in the direction along the Y axis.

According to this embodiment, this convexed curved surface corresponds to the contact surface 21A (FIGS. 5 through 7, 8A, 8B, 9B, and 10B).

As illustrated in FIGS. 5, 8A, 8B, 9B, and 10B, a pair of projections 211 as cylindrical components projecting toward the outside are provided in a line along the Y axis on a plate surface of the first contact portion 21 on the side nearer to the other cover 5.

The control lever 22 as a lever operated by the observer moves in a second direction D2 (FIGS. 8A and 8B) crossing the first direction D1 when operated by the user so as to shift the first contact portion 21 in the first direction D1 in accordance with the movement of the control lever 22 in the second direction D2.

The control lever 22 which has an operation portion 221 and a junction portion 222 (FIGS. 8A and 8B) is disposed on the +Z axis side with respect to the pair of the support members 12, and on the side nearer to the other cover 5 with respect to the first contact portion 21.

As illustrated in FIGS. 7, 8A and 8B, a side wall portion 52 of the first cover 5A positioned below the first attachment hole 51 is inclined to the X-Y plane substantially at 45 degrees, and obliquely extends in the second direction D2 which lengthens downwardly from the −Z axis side to the +Z axis side.

According to this embodiment, therefore, the first and second directions D1 and D2 cross each other substantially at 45 degrees.

An operation hole (not shown) extending in the second direction D2 is formed in the side wall portion 52.

As illustrated in FIGS. 8A and 8B, the operation portion 221 includes a sliding portion 221A having a rectangular plate shape and sliding on an inner surface of the side wall portion 52, and an operation knob 221B projecting from a plate surface of the sliding portion 221A and exposed to the outside of the cover 5 via the operation hole.

As illustrated in FIGS. 8A and 8B, the junction portion 222 as a portion joined to the first contact portion 21 has a plate shape extending along the Y-Z plane. One end of the junction portion 222 connected with the approximately center of the plate surface of the sliding portion 221A is extended diagonally upward toward the other end of the junction portion 222, and further bended in an upward direction along the Y axis.

As illustrated in FIGS. 8A and 8B, the junction portion 222 has a pair of junction holes 222A through which the pair of the projections 211 of the first contact portion 21 are inserted.

Each of the pair of the junction holes 222A is constituted by a track hole extending along the Y axis. The junction holes 222A are disposed in a line along the Y axis.

The guide member 23 is a plate-shaped component extending along the Y-Z plane, and holds the first contact portion 21 and the control lever 22 such that these components 21 and 22 can shift between the guide member 23 and the inner surface of the first cover 5A by attachment of the guide member 23 to the inner surface of the first cover 5A.

As illustrated in FIGS. 8A and 8B, a recess 231 is provided in a plate surface of the guide member 23 opposed to the junction portion 222. The recess 231 is formed such that the upper side and the −Z axis side thereof communicate with an edge of the guide member 23, as a portion on which the junction portion 222 is disposed.

As illustrated in FIGS. 8A and 8B, a part of a side wall of the recess 231 is configured to follow the external shape of a +Z axis side end of the junction portion 222.

This part of the side wall contacts the control lever 22 shifted in the second direction D2 toward the +Z axis side to function as a first regulation surface 231A for regulating shift of the control lever 22.

As illustrated in FIGS. 8A and 8B, an upper part of the side wall of the recess 231 is so configured as to extend in the second direction D2.

This upper part of the side wall functions as a sliding surface 231B along which the junction portion 222 slides during shift of the control lever 22 in the second direction D2.

As illustrated in FIGS. 8A and 8B, a part of a lower end of the guide member 23 is inclined in the second direction D2.

This part of the lower end of the guide member 23 functions as a second regulation surface 232 which holds the sliding portion 221A such that the sliding portion 221A can shift between the second regulation surface 232 and the side wall portion 52 of the first cover 5A under the condition in which the guide member 23 is attached to the inner surface of the first cover 5A.

When the control lever 22 shifts in the second direction D2 toward the axis side while sliding on the sliding surface 231B in accordance with the movement of the operation knob 221B operated by the observer, the first contact portion 21 shifts toward the axis side together with the movement of the control lever 22 with the respective projections 211 guided by the corresponding junction holes 222A.

FIG. 8A illustrates a condition in which the first contact portion 21 shifted toward the +Z axis side to the maximum with contact between the junction portion 222 and the first regulation surface 231A.

When the temple 6 is rotated in the expanding direction around the rotation shaft 11 under the condition of the maximum shift of the first contact portion 21 toward the +Z axis side as illustrated in FIGS. 9A and 9B, the second contact portion 132 contacts the first contact portion 21 with a relatively large opening angle θ1 (FIG. 9A) of the temple 6.

On the other hand, when the control lever 22 shifts in the second direction D2 toward the −Z axis side while sliding on the sliding surface 231B in accordance with the movement of the operation knob 221B operated by the observer, the first contact portion 21 shifts toward the −Z axis side together with the movement of the control lever 22 with the respective projections 221 guided by the corresponding junction holes 222A similarly to the above operation.

FIG. 8B illustrates a condition in which the first contact portion 21 is shifted toward the −Z axis side to the maximum with contact between the junction portion 222 and an edge of the operation hole of the side wall portion 52.

When the temple 6 is rotated in the expanding direction around the rotation shaft 11 under the condition of the maximum shift of the first contact portion 21 toward the −Z axis side as illustrated in FIGS. 10A and 10B, the second contact portion 132 contacts the first contact portion 21 with an opening angle θ2 (FIG. 10A) of the temple 6 smaller than an opening angle θ1 of the temple 6.

Accordingly, the opening angle of the temple 6 can be adjusted in a range between the angle θ1 and the angle θ2 by the shift of the control lever 22 to an appropriate position in accordance with operation of the operation knob 221E by the observer.

According to the first embodiment, the following advantages can be offered.

In this embodiment, the first contact portion 21 is provided on the cover 5 as an area brought into contact with the temple 6 (the second contact portion 132) when the temple 6 is rotated in the expanding direction around the rotation shaft 11.

In this case, the opening angle θ of the temple 6 is regulated by the first contact portion 21.

Moreover, the control lever 22 which shifts the first contact portion 21 in the first direction D1 is equipped on the cover 5. In this case, the opening angle θ of the temple 6 can be adjusted by the change of the contact position between the first and second contact portions 21 and 132 in accordance with the shift of the first contact portion 21 in the first direction D1 along with the movement of the control lever 22.

Accordingly, the opening angle θ of the temple 6 becomes controllable by the functions of the first contact portion 21 and the control lever 22, which allows the use of the virtual image display 1 by various observers having different head sizes. Thus, the degree of convenience in use of the virtual image display 1 increases.

The temple 6 is rotatably attached via the hinge mechanism 10 to the cover 5 which accommodates the image forming device 2.

In this case, the image forming device 2 does not rotate together with the rotation of the temple 6 even when the temple 6 is rotated. Thus, a preferable positional relationship between the projection lens 81 (the optical axis Ax) and the light guide member 3 (the first reflection surface 312) can be maintained, which allows the observer to observe excellent images.

The light guide member 3 has the image inlet portion 31, the total reflection portion 32, and the image outlet portion 33. Thus, the virtual image display 1 becomes a see-through type which allows the observer to observe the outside image as well as the image formed by the display element 7.

The first contact portion 21 and the control lever 22 shift in the first and second directions D1 and D2 crossing each other, respectively. The cover 5 has the guide member 23 having the sliding surface 231B.

According to this structure, the control lever 22 (the junction portion 222) can be pressed against the sliding surface 231B in accordance with the press of the first contact portion 21 by the second contact portion 132 at the time of rotation of the temple 6 in the expanding direction. In this condition, movement of the junction portion 222 is stopped by the sliding surface 231B extending in the second direction D2 crossing the first direction D1 in which the first contact portion 21 is pressed. Thus, shift of the control lever 22 in the second direction D2 along with the press of the first contact portion 21 can be prevented.

Accordingly, the opening angle θ of the temple 6 set by the change of the contact position between the first and second contact portions 21 and 132 by operation of the control lever 22 can be maintained at the desired angle, which further increases the degree of convenience in use of the virtual image display 1.

The structure of the hinge mechanism 10 constructed as above allows the temple 6 to be pressed with a predetermined force against the head of the observer wearing the virtual image display 1 by utilizing the urging force of the urging member 14. In this case, the temple 6 can be fitted to the head of the observer in a more preferable condition, which improves the sense of fitness of the virtual image display 1 felt by the observer.

The pressing force of the temple 6 against the head of the observer can be adjusted by the change of the contact position between the first and second contact portions 21 and 132 in accordance with the operation of the control lever 22. The structure capable of controlling the pressing force by the observer's own operation further increases the degree of convenience in use of the virtual image display 1.

The contact surface 21A of the first contact portion 21 is a convex curved surface. Thus, the temple 6 can be rotated around the virtual line VA in a preferable condition.

Second Embodiment

A second embodiment according to the invention is hereinafter described with reference to the drawings.

In the following description, the structures and parts in this embodiment similar to the corresponding structures and parts in the first embodiment have been given similar reference numbers, and the detailed explanation of those structures and parts is not repeated or only briefly explained.

Figure 11:
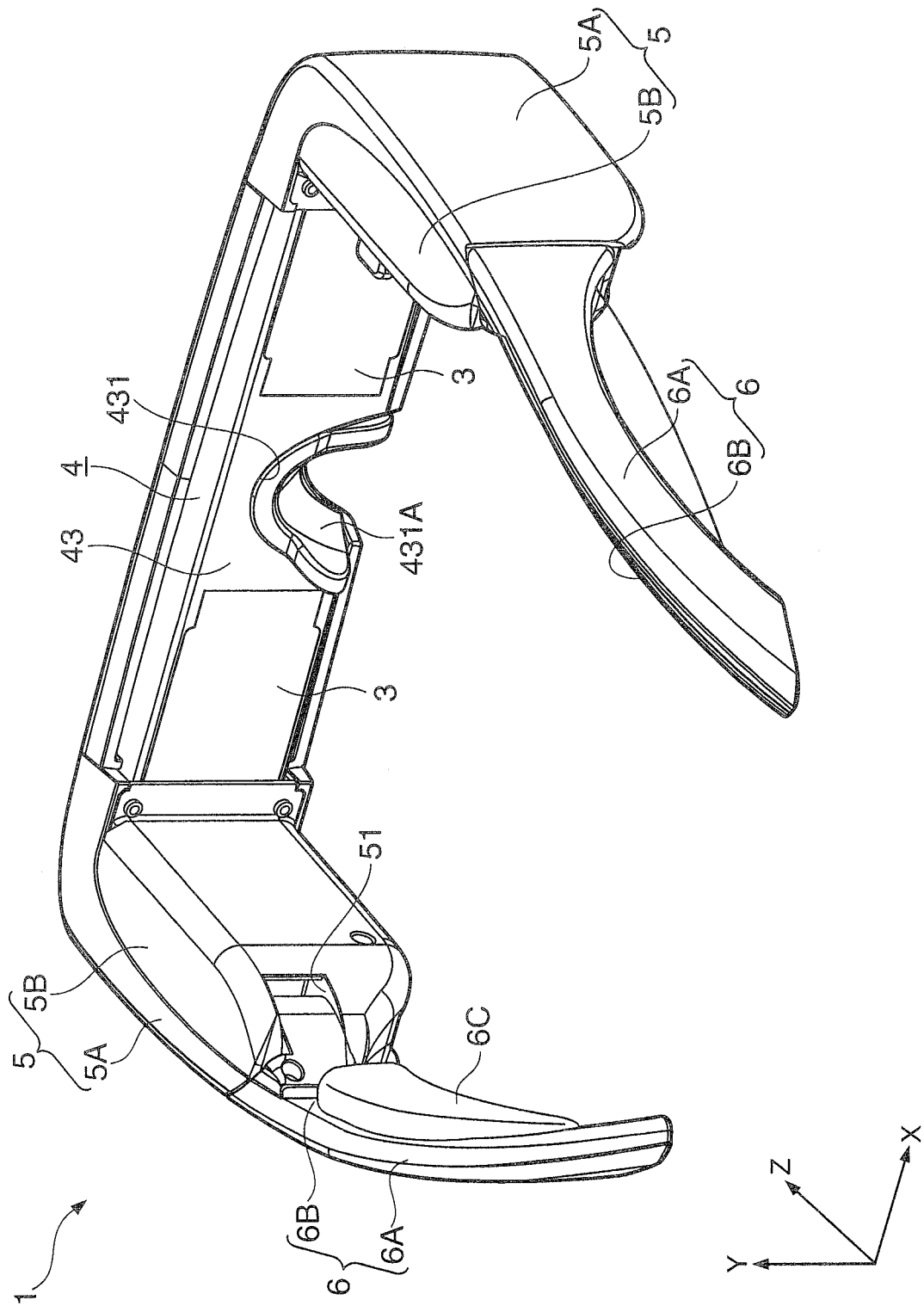
FIG. 11 is a perspective view illustrating the external appearance of a virtual image display according to a second embodiment.

FIG. 11 is a perspective view illustrating the external appearance of the virtual image display 1 according to the second embodiment.

The construction of the virtual image display 1 in the second embodiment is similar to that of the virtual image display 1 in the first embodiment except that a cushion member 6C is provided on each of the temples 6, and that the control mechanism 20 has a different structure.

More specifically, as illustrated in FIG. 11, the cushion member 6C is attached to the temple 6 in such a condition as to expand toward the other temple 6 (toward the observer) in the second embodiment.

Figure 12:
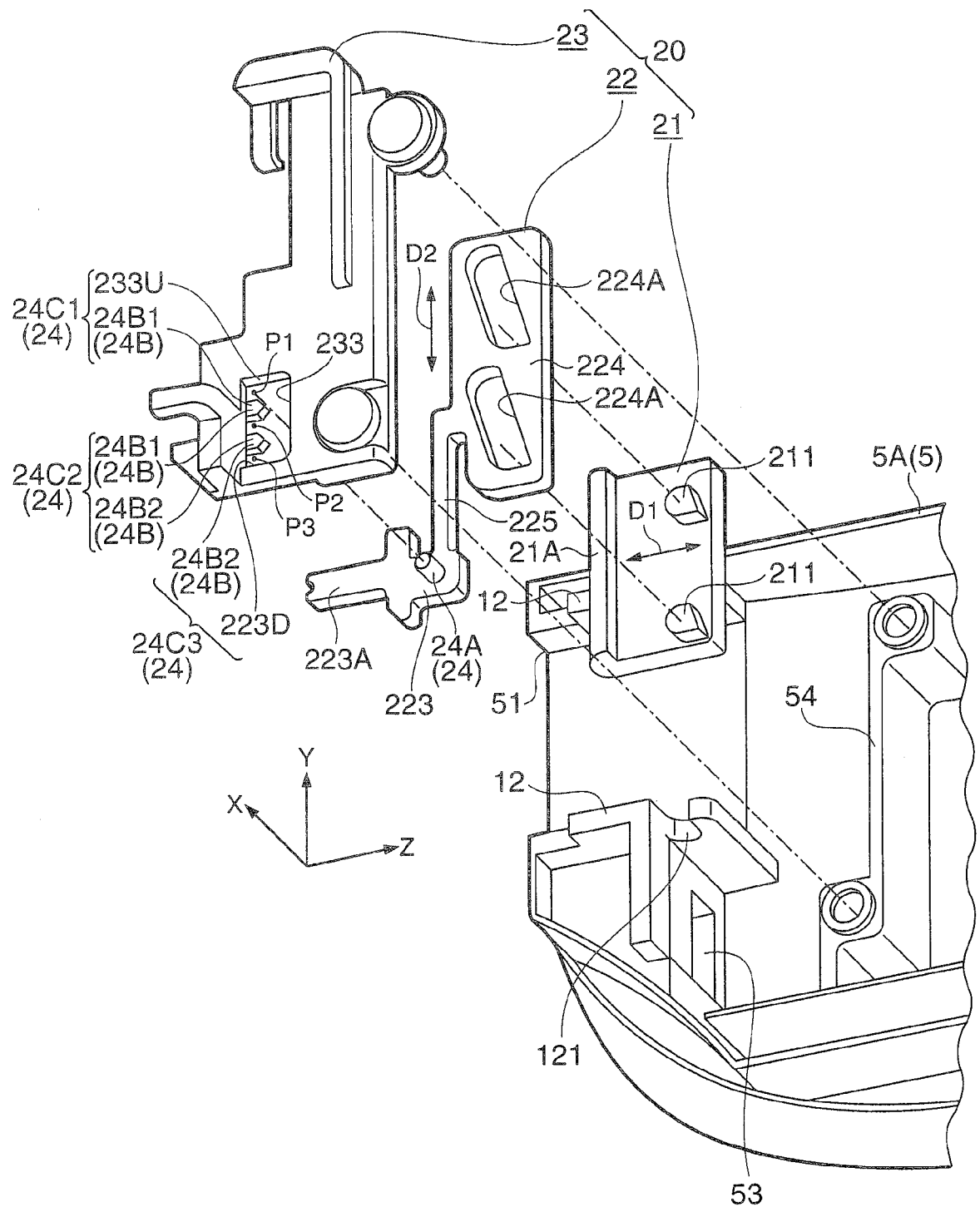
FIG. 12 illustrates the structure of a control mechanism according to the second embodiment.

FIG. 12 illustrates the structure of the control mechanism 20 according to the second embodiment. More specifically, FIG. 12 is a perspective view showing the control mechanism 20 in a disassembled condition as viewed from the side nearer to the other cover 5.

As illustrated in FIG. 12, the control mechanism 20 in the second embodiment includes the first contact portion 21 as a contact member, the control lever 22 as a position control member, and the guide member 23 similarly to the control mechanism 20 in the first embodiment. However, the structures of the components 21 through 23 are different from those in the first embodiment.

According to the second embodiment, a −Z axis side surface of each of the pair of the projections 211 of the first contact portion 21 is convexed toward the −Z axis side, forming a convexed curved shape which has a substantially circular-arc cross section extending along the Y axis as illustrated in FIG. 12. On the other hand, a +Z axis side surface of each of the projections 211 has a flat shape inclined with respect to the X-Y plane (inclined toward the −Z axis side in the upward direction).

As illustrated in FIG. 12, the control lever 22 in the second embodiment has a base 223, a junction portion 224, and a connection portion 225.

An operation hole 53 which connects the inside and the outside of the cover 5 such that they can communicate with each other and extends in the second direction D2 is formed in an area of the first cover 5A below the first attachment hole 51.

According to the second embodiment, the second direction D2 corresponds to the direction along the Y axis.

Therefore, the first and second directions D1 and D2 in the second embodiment cross each other substantially at right angles.

The base 223 is a plate-shaped portion extending along the Y-Z plane.

As illustrated in FIG. 12, an operation portion 223A provided at a −Z axis side end of the base 223 is an area projecting along the Z axis toward the −Z axis side and exposed to the outside of the cover 5 via the operation hole 53.

As illustrated in FIG. 12, a cylindrical engaging projection 24A projecting toward the other cover 5 is provided on a plate surface of the base 223 on the side nearer to the other cover 5.

As illustrated in FIG. 12, the junction portion 224 is an area joined to the first contact portion 21 as a rectangular-plate-shaped region extending along the Y-Z plane and elongated in the Y axis direction.

As illustrated in FIG. 12, the junction portion 224 has a pair of junction holes 224A through which the pair of the projections 211 of the first contact portion 21 are inserted.

Each of the pair of the junction holes 224A is constituted by a track hole extending in a direction inclined to the Y axis (inclined toward the −Z axis side in the upward direction). The pair of the junction holes 224A are disposed in a line along the Y axis.

Each inclination angle of the junction holes 224A is set at the same angle as each inclination angle of the +Z axis side surface of the projections 211.

The connection portion 225 is an area connecting the base 223 and the junction portion 224.

More specifically, the connection portion 225 extends along the Y axis. One end of the connection portion 225 connects with an upper end of the base 223, while the other end of the connection portion 225 connects with a −Z axis side end of the junction portion 224.

Thus, the connection portion 225 extends in the second direction D2 which is also a direction perpendicular to a projection direction of the operation portion 223A (in the direction along the Z axis).

The connection portion 225 is so constructed as to be elastically deformable by the operation of the operation portion 223A by the observer (press toward the +Z axis side) in accordance with the material of the control lever 22, the shape of the connection portion 225, and other conditions.

The guide member 23 is a plate-shaped component which extends along the Y-Z plane and holds the first contact portion 21 and the control lever 22 such that these components 21 and 22 can shift between the guide member 23 and the inner surface of the first cover 5A after attachment of the guide member 23 to the inner surface of the first cover 5A.

According to this embodiment, the guide member 23 corresponds to an attachment member according to the invention. Thus, the guide member 23 is hereinafter referred to as the attachment member 23 for convenience of explanation.

As illustrated in FIG. 12, a rectangular opening 233 is formed in the attachment member 23 at a position corresponding to the base 223. The opening 233 penetrates front and rear surfaces of the attachment member 23, and has a shape elongated in the Y axis direction.

The engaging projection 24A is inserted into the opening 233 under the condition in which the attachment member 23 is attached to the inner surface of the cover 5A.

As illustrated in FIG. 12, two projections 24B projecting toward the +Z axis side are provided at a −Z axis side edge of the opening 233 and disposed in a line along the Y axis (in the second direction D2).

In other words, the two projections 24B project in the direction (+Z axis direction) opposite to the projection direction (−Z axis direction) of the operation portion 223A.

The corners of a tip of each of the projections 24B are chamfered such that the tip becomes thinner in the +Z axis direction.

Hereinafter, the upper projection 24B of the two projections 248 is referred to as an upper projection 24B1, while the lower projection 24B is referred to as a lower projection 24B2 for convenience of explanation.

The operation of the control mechanism 20 in this embodiment is now explained.

FIGS. 13A through 13C illustrate the operation of the control mechanism 20, showing the action of the connection portion 225 when the engaging projection 24A shifts from a first setting position P1 to a second setting position P2.

As illustrated in FIG. 12, the first setting position P1 is disposed within the opening 233 at a position between an upper edge 233U of the opening 233 and the upper projection 24B1.

The second setting position P2 is disposed within the opening 233 at a position between the upper projection 24B1 and the lower projection 24B2.

A third setting position P3 is disposed within the opening 233 at a position between the lower projection 24B2 and a lower edge 233D (FIG. 12) of the opening 233.

Under the condition in which the engaging projection 24A is positioned at the first setting position P1 as illustrated in FIG. 13A, shift of the control lever 22 in the second direction D2 is regulated by the edge 233U and the upper projection 24B1.

Hereinafter, the edge 233U and the upper projection 24B1 are collectively referred to as a first engagement receiving portion 24C1 (FIG. 12).

The control lever 22, therefore, can be disposed at the first setting position P1 by engagement between the engaging projection 24A and the first engagement receiving portion 24C1.

In the condition in which the control lever 22 is positioned at the first setting position P1, the respective projections 211 are guided toward the +Z axis side by the corresponding junction holes 224A along with shift of the first contact portion 21 toward the +Z axis side to the maximum.

Under the condition of the control lever 22 positioned at the first setting position P1, the opening angle θ of the temple 6 formed under the contact between the first contact portion 21 and the second contact portion 132 by rotation of the temple 6 in the expanding direction around the rotation shaft 11 becomes relatively large.

When the observer presses the operation portion 223A toward the +Z axis side, the connection portion 225 elastically deforms as illustrated in FIG. 13B.

In this case, the base 223 (the engaging projection 24A) shifts toward the +Z axis side in accordance with the elastic deformation of the connection portion 225. As a result, the engaging projection 24A and the first engagement receiving portion 24C1 are brought into disengagement condition (release of engaging condition). In this condition, the control lever 22 is movable in a downward direction.

When the operation portion 223A is shifted downward by the observer while pressed toward the +Z axis side, the junction portion 224 moves downward while guided by a side wall 54 (FIG. 12) provided on the inner surface of the first cover 5A and extending along the Y axis and by other parts.

Moreover, the first contact portion 21 shifts toward the −Z axis side along with the shift of the control lever 22 with the respective projections 211 guided toward the −Z axis side by the corresponding junction holes 224A.

When the press of the operation portion 223A toward the +Z axis side by the observer is released, the connection portion 225 returns to its original shape. As a result, the engaging projection 24A comes to the second setting position P2 as illustrated in FIG. 13C, for example.

Under this condition, shift of the control lever 22 in the second direction D2 is regulated by the upper projection 24B1 and the lower projection 24B2.

Hereinafter, the upper projection 24B1 and the lower projection 24B2 are collectively referred to as a second engagement receiving portion 24C2 (FIG. 12).

The control lever 22, therefore, can be positioned at the second setting position P2 by engagement between the engaging projection 24A and the second engagement receiving portion 24C2.

When the operation portion 223A under the condition shown in FIG. 13C is further shifted downward by the observer while pressed toward the +Z axis side in a manner similar to above, the first contact portion 21 further moves toward the −Z axis side. This action is not specifically shown in the figures.

When the press of the operation portion 223A by the observer is released, the engaging projection 24A comes to the third setting position P3.

Under this condition, shift of the control lever 22 in the second direction D2 is regulated by the lower projection 24B2 and the edge 233D.

Hereinafter, the lower projection 24B2 and the edge 233D are collectively referred to as a third engagement receiving portion 24C3 (FIG. 12).

The control lever 22, therefore, can be positioned at the third setting position P3 by engagement between the engaging projection 24A and the third engagement receiving portion 24C3.

Under the condition of the control lever 22 positioned at the third setting position P3, the opening angle θ of the temple 6 formed under the contact between the first contact portion 21 and the second contact portion 132 by rotation of the temple 6 in the expanding direction around the rotation shaft 11 becomes smaller than the opening angle θ formed when the control lever 22 is positioned at the first setting position P1.

The engaging projection 24A and the first through third engagement receiving portions 24C1 through 24C3 correspond to an engaging structure 24 (FIG. 12) according to the invention.

According to the virtual image display 1 in this embodiment, therefore, the appropriate opening angle θ of the temple 6 can be selected from three angles by the function of the engaging structure 24.

The opening angle θ of the temple 6 becomes the largest when the engaging projection 24A is positioned at the first setting position P1, and becomes the smallest when the engaging projection 24A is position at the third position P3.

According to the second embodiment, the following advantages can be offered as well as those provided in the first embodiment.

In this embodiment, the engaging structure 24 is equipped on the control lever 22 and the attachment member 23.

According to this structure, when the control lever 22 is pressed by the temple 6 via the first contact portion 21 by rotation of the temple 6 in the expanding direction, shift of the control lever 22 in the second direction D2 can be prevented by the function of the engaging structure 24.

Therefore, the opening angle θ of the temple 6 set after positioning the control lever 22 at any of the first through third setting positions P1 through P3 by using the engaging structure 24 can be maintained at the desired angle, hence the degree of convenience in use of the virtual image display 1 further increases.

The three setting positions P1 through P3 for the control lever 22 provide three levels of the opening angle θ of the temple 6, which further improves the convenience in use of the virtual image display 1.

The engaging projection 24A constituting the engaging structure 24 is disposed on the base 223 having the operation portion 223A operated by the user. Moreover, the control lever 22 has the connection portion 225 connecting the base 223 and the junction portion 224 and so constructed as to be elastically deformable in addition to the components of the base 223 and the junction portion 224.

According to this structure, the observer can set the disengagement condition between the engaging projection 24A and the first through third engagement receiving portions 24C1 through 24C3 by operation of the operation portion 223A for elastic deformation of the connection portion 225, that is, for allowing shift of the engaging projection 24A (the base 223) toward the +Z axis side. Moreover, the observer can return the connection portion 225 to its original shape by stopping operation of the operation portion 223A, that is, can set the engagement condition between the engaging projection 24A and the first through third engagement receiving portions 24C1 through 24C3 by shifting the engaging projection 24A toward the −Z axis side.

Accordingly, the engagement condition or the disengagement condition can be established only by operation of the operation portion 223A. This structure does not require an additional dedicated unit for setting the engagement condition and the disengagement condition, which contributes to simplification of the engaging structure 24.

The connection portion 225 extends in a direction perpendicular to the projection direction of the operation portion 223A (direction along the Z axis). In this case, the observer can easily achieve elastic deformation of the connection portion 225 only by pressing the operation portion 223A in a direction opposite to the projection direction of the operation portion 223A (toward the +Z axis side). Thus, the observer can easily set the disengagement condition between the engaging projection 24A and the first through third engagement receiving portions 24C1 through 24C3.

When the length of the connection portion 225 is appropriately adjusted, the force required for elastic deformation of the connection portion 225 can be set at an appropriate force.

Accordingly, the maneuverability of the virtual image display 1 for controlling the opening angle θ of the temple 6 can improve.

An extending direction of the connection portion 225 (direction along the Y axis) agrees with the second direction D2, and crosses the projection direction of the operation portion 223A (direction along the Z axis) at right angles.

According to this structure, the observer can set the disengagement condition between the engaging projection 24A and the first through third engagement receiving portions 24C1 through 24C3 only by pressing the operation portion 223A in the direction (toward the +Z axis side) opposite to the projection direction of the operation portion 223A, and also can shift the control lever 22 in the second direction D2, that is, moves the first contact portion 21 along with the shift of the control lever 22 only by shifting the operation portion 223A in the direction (direction along the Y axis) perpendicular to the projection direction of the operation portion 223A.

Accordingly, the maneuverability of the virtual image display 1 for controlling the opening angle θ of the temple 6 can further improve.

The first through third engagement receiving portions 24C1 through 24C3 include the two projections 24B disposed in a line in the second direction D2. According to this structure, the engagement condition can be set by insertion of the engaging projection 24A between the two projections 24B or other positions. The two projections 24B project in the direction (toward +Z axis side) opposite to the projection direction of the operation portion 223A.

In this case, the observer can easily set the disengagement condition where the engaging projection 24A is shifted to the outside from the position between the two projections 24B only by pressing the operation portion 223A in the direction (toward +Z axis side) opposite to the projection direction of the operation portion 223A.

Accordingly, the maneuverability of the virtual image display 1 for controlling the opening angle θ of the temple 6 can further improve.

The cushion member 6C is provided on the temple 6. In this case, the observer wearing the virtual image display 1 can tightly fit the cushion member 6C to the head of the observer by deformation of the cushion member 6C in accordance with the shape of the head.

Therefore, the sense of fitness of the virtual image display 1 felt by the observer can further improve.

Particularly, the combination of the urging force generated by the urging member 14 and the dampening effect produced by the cushion member 6C further improves the attachment of the virtual image display 1 to the head of the observer, thereby contributing to a more preferable sense of fitness of the virtual image display 1 felt by the observer.

The invention is not limited to the embodiment described and depicted herein. Modifications, improvements and the like including the following changes may be made without departing from the scope of the invention.

According to the respective embodiments, the virtual image display 1 includes the transmission-type liquid crystal display device 71. However, other structures such as a reflection-type liquid crystal display device and a digital micromirror device may be employed.

The control mechanism 20 provided on the cover 5 in the respective embodiments may be disposed on the temple 6.

According to the respective embodiments, the guide member 23 or the attachment member 23 is provided separately from the cover 5. However, the guide member 23 or the attachment member 23 may be formed integrally with the cover 5 (for example, formed integrally with the second cover 5B). Similarly, in the case of the control mechanism 20 disposed on the temple 6, the guide member 23 or the attachment member 23 may be provided either separately from the temple 6 or integrally with the temple 6.

According to the first embodiment, the first and second directions D1 and D2 are so determined as to cross each other approximately at 45 degrees. However, the crossing angle is not limited to 45 degrees but may be other degrees.

Similarly, according to the second embodiment, the first and second directions D1 and D2 are so determined as to cross each other at 90 degrees. However, the crossing angle is not limited to 90 degrees but may be other degrees.

According to the respective embodiments, the hinge mechanism 10 has the urging member 14 to press the temple 6 against the head of the observer by the predetermined force. However, the temple 6 may be made of elastic material and pressed against the head of the observer by its own elastic force.

According to the respective embodiments, the image forming device 2 is provided for each of the left eye and the right eye. However, the image forming device 2 maybe equipped only for either the left eye or the right eye (that is, the image forming device 2 is accommodated only within either one of the pair of the covers 5).

According to the second embodiment, the opening angle θ of the temple 6 is selected from three angles by the function of the engaging structure 24. However, the opening angle θ may be selected from two angles, four angles or more.

According to the respective embodiments, the light guide member 3 has a function of introducing image light projected from the image forming device 2 toward the inside of the light guide member 3, and then guiding the image light toward the predetermined outside position. However, the light guide member 3 may have other structures such as a mirror as long as they can guide the image light projected from the image forming device 2 toward the predetermined outside position.

The entire disclosure of Japanese Patent Application Nos.2011-022230, filed Feb. 4, 2011 and 2011-191811, filed Sep. 2, 2011 are expressly incorporated by reference herein.

What is claimed is:

1. A virtual image display comprising:
    at least an image forming device which includes a display element emitting image light, and a projection lens projecting the image light received from the display element;
    a pair of accommodating members at least one of which accommodates the image forming device;
    a light guide member which guides image light received from the image forming device toward a predetermined outside position;
    a pair of temples, a first temple of the pair of temples being rotatably attached to a first accommodating member of the pair of the accommodating members via a hinge mechanism,
        the first temple moving closer or farther apart from a second temple of the pair of temples during a rotation of the first temple via the hinge mechanism;
    a contact member disposed on either the first temple or the first accommodating member, the contact member regulating the rotation of the first temple relative to the accommodating member via the hinge mechanism; and
    a position control member, wherein
        during the rotation of the first temple relative to the accommodating member via the hinge mechanism, the position control member shifts the contact member in a first direction, causing a distance between the contact member and the first accommodating member to expand or contract.

2. The virtual image display according to claim 1, wherein the light guide member is a member which guides the image light received from the image forming device toward the predetermined outside position and through which an external image can be observed.

3. The virtual image display according to claim 1, wherein the position control members are movable in a second direction crossing the first direction, and connect with the corresponding contact members to shift the contact members in the first direction in accordance with the movement of the position control members in the second direction; and
    each of the accommodating members or temples on which the contact member and the position control member are provided has a guide member which has a sliding surface extending in the second direction and allows the corresponding position control member to slide on the sliding surface such that the shift of the position control member can be guided in the second direction.

4. The virtual image display according to claim 1, wherein each of the hinge mechanisms includes
    a rotation shaft which rotates the corresponding temple with respect to the corresponding accommodating member,
    a support member provided on the corresponding accommodating member to support the corresponding rotation shaft,
    a shaft support member provided on the corresponding temple and having an insertion hole through which the rotation shaft is inserted such that the shaft support member can be rotatably supported by the rotation shaft, and
    an urging member which extends between the corresponding rotation shaft and the corresponding temple and urges the temple in a direction nearer to the rotation shaft; and
    each of the insertion holes is a track hole which extends in a rotation direction around a virtual line passing through a contact position between the corresponding contact member and the corresponding accommodating member or temple on which the contact member and the position control member are not provided and extending in parallel with the rotation shaft.

5. The virtual image display according to claim 4, wherein each of the contact members has a convex curved shape which forms the shape of a contact surface between the contact member and the corresponding accommodating member or temple on which the contact member and the position control member are not provided.

6. The virtual image display according to claim 1, wherein the position control members are movable in a second direction crossing the first direction, and connect with the corresponding contact members to shift the contact members in the first direction in accordance with the movement of the position control members in the second direction;
    each of the accommodating members and temples on which the contact members and the position control members are provided has an attachment member which attaches the corresponding contact member and the corresponding position control member to the corresponding accommodating member or temple on which the contact member and the position control member are provided; and
    each of the position control members and the attachment members has an engaging structure which positions the position control member at any one of plural setting positions linearly disposed in the second direction by engagement between the corresponding position control member and the corresponding attachment member.

7. The virtual image display according to claim 6, wherein each of the position control members includes
    a base which has an operation portion,
    a junction portion joined to the corresponding contact member, and a connection portion which connects the base and the junction portion;

each of the engaging structures includes
- an engaging projection provided on the corresponding base, and
- a plurality of engagement receiving portions disposed on the corresponding attachment member in correspondence with the plural setting positions and engaging with the engaging projection; and each of the connection portions is elastically deformable.

8. The virtual image display according to claim 7, wherein
each of the operation portions projects toward the outside from the inside of the corresponding accommodating member or temple on which the contact member and the position control member are provided; and
each of the connection portions extends in a direction perpendicular to a projection direction of the operation portion.

9. The virtual image display according to claim 8, wherein each of the connection portions extends in the second direction.

10. The virtual image display according to claim 7, wherein
each of the operation portions projects toward the outside from the inside of the corresponding accommodating member or temple on which the contact member and the position control member are provided;
the plural engagement receiving portions have plural projections linearly disposed in the second direction; and
the plural projections project in a direction opposite to the projection direction of the corresponding operation portion.

11. The virtual image display according to claim 1, wherein each of the temples has a cushion member which expands toward the other temple.

12. The virtual image display according to claim 1, wherein the pair of temples are only rotatably attached to the pair of accommodating members.

* * * * *